(12) United States Patent
Seo et al.

(10) Patent No.: US 12,061,406 B2
(45) Date of Patent: Aug. 13, 2024

(54) LENS MODULE AND CAMERA MODULE INCLUDING SAME

(71) Applicant: LG INNOTEK CO., LTD., Seoul (KR)

(72) Inventors: Eun Sung Seo, Seoul (KR); Seung Ryong Park, Seoul (KR); Jae Wook Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 596 days.

(21) Appl. No.: 17/415,597

(22) PCT Filed: Dec. 13, 2019

(86) PCT No.: PCT/KR2019/017698
§ 371 (c)(1),
(2) Date: Jun. 17, 2021

(87) PCT Pub. No.: WO2020/130508
PCT Pub. Date: Jun. 25, 2020

(65) Prior Publication Data
US 2022/0082898 A1    Mar. 17, 2022

(30) Foreign Application Priority Data

Dec. 17, 2018  (KR) .................. 10-2018-0163503
Mar. 4, 2019   (KR) .................. 10-2019-0024509

(51) Int. Cl.
*G02F 1/29*     (2006.01)
(52) U.S. Cl.
CPC .................... *G02F 1/29* (2013.01)
(58) Field of Classification Search
CPC ........................................ G02F 1/29
USPC ........................................... 359/315
See application file for complete search history.

(56) References Cited

U.S. PATENT DOCUMENTS

2010/0142059 A1    6/2010  Chou et al.

FOREIGN PATENT DOCUMENTS

| JP | 2007-179044 A | 7/2007 |
| JP | 2009-037711 A | 2/2009 |
| JP | 2010-509640 A | 3/2010 |
| KR | 10-2013-0124674 A | 11/2013 |
| KR | 10-2018-0088080 A | 8/2018 |
| KR | 10-2018-0094615 A | 8/2018 |
| KR | 10-2018-0110882 A | 10/2018 |

OTHER PUBLICATIONS

International Search Report dated Mar. 23, 2020 in International Application No. PCT/KR/2019/017698.
Office Action dated Apr. 25, 2024 in Korean Application No. 10-2018-0163503.

*Primary Examiner* — Joseph P Martinez
*Assistant Examiner* — Grant A Gagnon
(74) *Attorney, Agent, or Firm* — SALIWANCHIK, LLOYD & EISENSCHENK

(57) ABSTRACT

A lens module in an embodiment includes a first plate having therein a first cavity; a second plate overlapping the first plate in a vertical direction, the second plate having therein a second cavity; a first liquid disposed in the first cavity; and a second liquid disposed in the second cavity, wherein a cross-section obtained by cutting the first cavity in a horizontal direction perpendicular to the vertical direction has a polygonal shape, and wherein a cross-section obtained by cutting the second cavity in the horizontal direction has a circular shape.

20 Claims, 40 Drawing Sheets

FIG. 21

| SHAKING ANGLE | | Static tilt | | EXCITATION FREQUENCY | | | | | | |
|---|---|---|---|---|---|---|---|---|---|---|
| | | | | 2Hz | | 6Hz | | 10Hz | | |
| | | COMPARATIVE EXAMPLE | EMBODIMENT | COMPARATIVE EXAMPLE | EMBODIMENT | COMPARATIVE EXAMPLE | EMBODIMENT | COMPARATIVE EXAMPLE | EMBODIMENT | |
| 0.3° | WFE(um) | 0.197 | 0.072 | (min/max) 0.06/0.22 | (min/max) 0.06/0.11 | (min/max) 0.09/0.28 | (min/max) 0.06/0.13 | (min/max) 0.15/0.38 | (min/max) 0.11/0.22 | |
| | APPLIED VOLTAGE (code) | 48 | 24/33 | 50 | 25/35 | 60 | 30/42 | 70 | 35/49 | |
| 0.6° | WFE(um) | 0.429 | 0.177 | 0.16/0.6 | 0.16/0.21 | 0.27/0.68 | 0.16/0.29 | 0.38/0.77 | 0.15/0.44 | |
| | APPLIED VOLTAGE (code) | 95 code | 48/66 | 100 | 50/70 | 120 | 60/84 | 140 | 70/98 | |

LENS MODULE AND CAMERA MODULE INCLUDING SAME

CROSS-REFERENCE TO RELATED APPLICATIONS

This application is the U.S. national stage application of International Patent Application No. PCT/KR2019/017698, filed Dec. 13, 2019, which claims the benefit under 35 U.S.C. § 119 of Korean Application Nos. 10-2018-0163503, filed Dec. 17, 2018; and 10-2019-0024509, filed Mar. 4, 2019, the disclosures of each of which are incorporated herein by reference in their entirety.

TECHNICAL FIELD

Embodiments relate to a lens module and a camera module including the same.

BACKGROUND ART

People who use portable devices demand optical devices that have high resolution, are small, and have various photographing functions. For example, these various photographing functions may be at least one of an optical zoom-in/zoom-out function, an auto-focusing (AF) function, or a hand-tremor compensation or optical image stabilization (OIS) function.

In the conventional art, in order to implement the various photographing functions described above, a method of combining a plurality of lenses and directly moving the combined lenses is used. In the case in which the number of lenses is increased, however, the size of the optical device may increase.

The auto-focusing and hand-tremor compensation functions are performed by moving or tilting a plurality of lenses, which are secured to a lens holder and are aligned along an optical axis, in an optical-axis direction or a direction perpendicular to the optical axis. To this end, a separate lens-moving apparatus is required in order to move a lens assembly composed of a plurality of lenses. However, the lens-moving apparatus has high power consumption, and an additional cover glass needs to be provided separately from a camera module in order to protect the lens-moving apparatus, thus causing a problem in that the overall size of the conventional camera module is increased. In order to solve this, studies have been conducted on a liquid lens that performs auto-focusing and hand-tremor compensation functions by electrically adjusting the curvature and tilting of an interface between two types of liquids.

However, in the conventional liquid lens, because two liquids are accommodated in containers having the same shape, there is a problem in that it is difficult to simultaneously correct a contact angle error for auto-focusing and a contact angle error for hand-tremor compensation.

In addition, because a lens unit for performing auto-focusing and a lens unit for performing a hand-tremor compensation function are disposed so as to be spaced apart from each other in an optical device, there is a problem in that the overall size of the optical instrument (or the optical device) is increased.

DISCLOSURE

Technical Problem

A first embodiment provides a lens module, in which no wavefront error occurs when an OIS function is performed or when an OIS function and an AF function are simultaneously performed, and a camera module including the same.

A second embodiment provides a liquid lens module capable of precisely performing a hand-tremor compensation function.

The objects to be accomplished by the embodiments are not limited to the above-mentioned objects, and other objects not mentioned herein will be clearly understood by those skilled in the art from the following description.

Technical Solution

A lens module according to a first embodiment may include a first plate having therein a first cavity, a second plate overlapping the first plate in a vertical direction, the second plate having therein a second cavity, a first liquid disposed in the first cavity, and a second liquid disposed in the second cavity, wherein the cross-section obtained by cutting the first cavity in a horizontal direction perpendicular to the vertical direction may have a polygonal shape, and the cross-section obtained by cutting the second cavity in the horizontal direction may have a circular shape.

For example, the lens module may include a third plate disposed on the first plate, a fourth plate disposed under the second plate, and a third liquid disposed between the first liquid and the second liquid.

For example, the lens module may include a third plate coupled to the first plate, a fourth plate coupled to the second plate, and a fifth plate disposed between the first plate and the second plate.

For example, the lens module may include a sixth plate disposed between the first plate and the second plate, the fifth plate may be coupled to the first plate, and the sixth plate may be coupled to the second plate.

For example, the lens module may include a third liquid disposed in the first cavity and a fourth liquid disposed in the second cavity.

For example, one of the first liquid and the third liquid may be a conductive liquid, and the remaining one of the first liquid and the third liquid may be a non-conductive liquid.

A camera module according to another embodiment may include an image sensor and a lens module overlapping the image sensor on an optical axis, wherein the lens module may include a first lens, including a first plate having therein a first cavity and a first liquid disposed in the first cavity, and a second lens overlapping the first lens in the direction of the optical axis, the second lens including a second plate having therein a second cavity and a second liquid disposed in the second cavity. The first cavity in the first lens may have a cross-sectional shape in which a finite number of normal lines pass through the optical axis, and the second cavity in the second lens may have a cross-sectional shape in which an infinite number of normal lines pass through the optical axis.

For example, the first lens may be controlled to correct shaking, and the second lens may be controlled to adjust a focus.

A liquid lens module according to a second embodiment may include a first liquid lens including a first cavity and a plurality of first individual electrodes disposed so as to be spaced apart from each other, with a first boundary portion interposed therebetween, the first boundary portion including a plurality of boundary portions, and a second liquid lens including a second cavity overlapping the first cavity in the direction of an optical axis and a plurality of second individual electrodes disposed so as to be spaced apart from each other, with a second boundary portion interposed therebetween, the second boundary portion including a plurality of boundary portions, wherein the first boundary portion and the second boundary portion may be disposed so as not to overlap each other in a direction parallel to the optical axis.

For example, when viewed in plan, the minimum angle between a first imaginary line extending from the optical axis, passing through the center of the first cavity and the center of the second cavity, to the first boundary portion and a second imaginary line extending from the optical axis to the second boundary portion may be equal to or less than $\Delta\theta$ expressed below.

Here, M represents the number of first individual electrodes, and N represents the number of second individual electrodes.

For example, each of the plurality of first individual electrodes and the second boundary portion may overlap each other in the direction parallel to the optical axis, and each of the plurality of second individual electrodes and the first boundary portion may overlap each other in the direction parallel to the optical axis.

For example, the first liquid lens may include a first lower plate including therein the first cavity in which a conductive liquid and a non-conductive liquid are disposed, a second lower plate disposed on one of the upper side and the lower side of the first lower plate, and a third lower plate disposed on the other one of the upper side and the lower side of the first lower plate, and the second liquid lens may include a first upper plate including therein the second cavity in which a conductive liquid and a non-conductive liquid are disposed, a second upper plate disposed on one of the upper side and the lower side of the first upper plate, and a third upper plate disposed on the other one of the upper side and the lower side of the first upper plate.

For example, one of the second and third lower plates and one of the second and third upper plates may face each other, and may be integrated with each other.

For example, the first cavity may include first and second openings, respectively formed in the upper portion and the lower portion of the first lower plate, and the second cavity may include third and fourth openings, respectively formed in the upper portion and the lower portion of the first upper plate. The larger opening among the first and second openings and the larger opening among the third and fourth openings may have the same size, and the smaller opening among the first and second openings and the smaller opening among the third and fourth openings may have the same size.

For example, the first boundary portion may be disposed in a direction corresponding to an edge of the first liquid lens, and the second boundary portion may be disposed in a direction corresponding to a corner of the second liquid lens.

Advantageous Effects

The lens module according to the first embodiment and a camera module including the same are capable of performing an OIS function with a greatly reduced wavefront error, and are capable of simultaneously performing an AF function and an OIS function with a greatly reduced wavefront error.

According to the liquid lens module of the second embodiment, even though no voltage is applied to boundary portions for separating a plurality of individual electrodes from each other, a wavefront error does not occur, or is reduced, when an OIS function is performed, whereby the quality of an image provided by an instrument using the liquid lens module may be improved.

However, the effects achievable through the embodiments are not limited to the above-mentioned effects, and other effects not mentioned herein will be clearly understood by those skilled in the art from the following description.

DESCRIPTION OF DRAWINGS

FIG. 21 is a table for comparing the characteristics of the comparative example and the characteristics of the liquid lens module according to the embodiment.

BEST MODE

Figure 1:
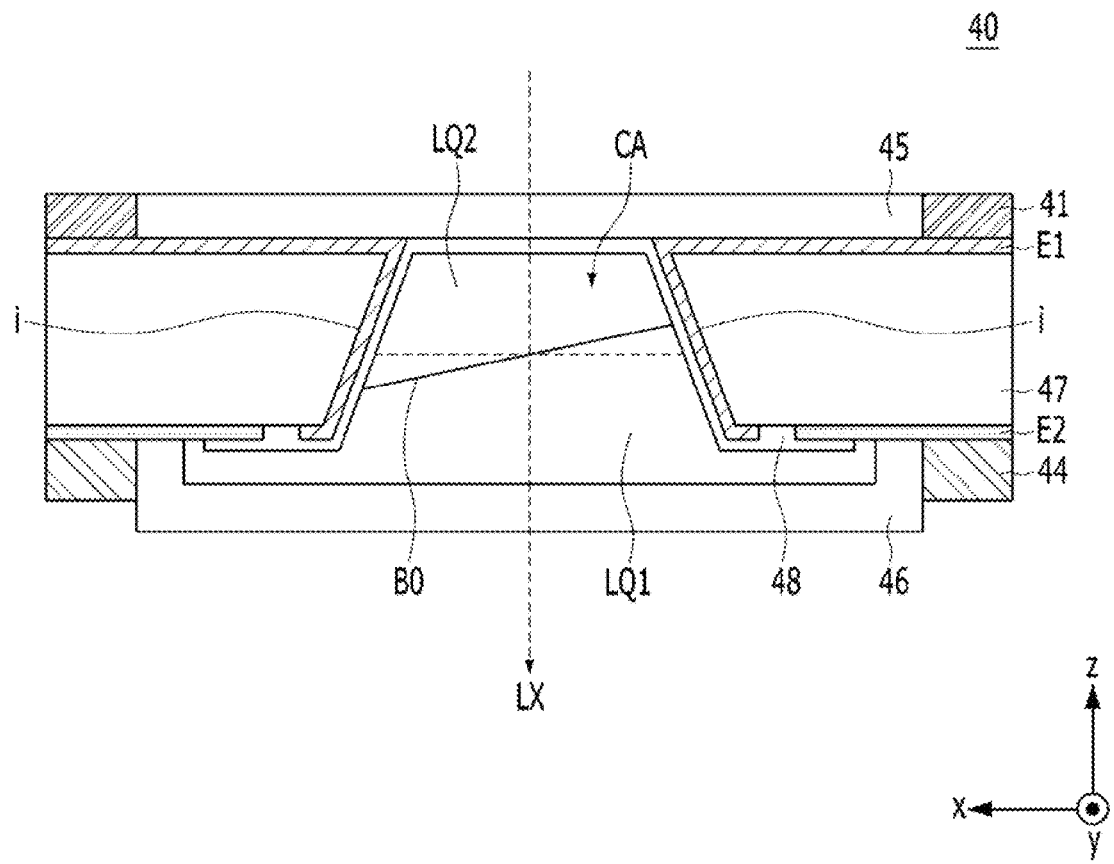
FIG. 1 is a cross-sectional view of a liquid lens module according to a first embodiment.

Hereinafter, exemplary embodiments of the present disclosure will be described in detail with reference to the accompanying drawings.

The technical spirit of the disclosure is not limited to the embodiments to be described, and may be implemented in various other forms, and one or more of the components may be selectively combined and substituted for use without exceeding the scope of the technical spirit of the disclosure.

In addition, terms (including technical and scientific terms) used in the embodiments of the disclosure, unless specifically defined and described explicitly, are to be interpreted as having meanings that may be generally understood by those having ordinary skill in the art to which the disclosure pertains, and meanings of terms that are commonly used, such as terms defined in a dictionary, should be interpreted in consideration of the context of the relevant technology.

Further, the terms used in the embodiments of the disclosure are for explaining the embodiments and are not intended to limit the disclosure. In this specification, the singular forms may also include plural forms unless otherwise specifically stated in a phrase, and in the case in which "at least one (or one or more) of A, B, or C" is stated, it may include one or more of all possible combinations of A, B, and C.

In addition, in describing the components of the embodiments of the disclosure, terms such as "first", "second", "A", "B", "(a)", and "(b)" can be used. Such terms are only for distinguishing one component from another component, and do not determine the nature, sequence or procedure etc. of the corresponding constituent elements.

In addition, when it is described that a component is "connected", "coupled" or "joined" to another component, the description may include not only being directly "connected", "coupled" or "joined" to the other component but also being "connected", "coupled" or "joined" by another component between the component and the other component.

In addition, in the case of being described as being formed or disposed "above (on)" or "below (under)" another component, the description includes not only the case where the two components are in direct contact with each other, but also the case where one or more other components are formed or disposed between the two components. In addition, when expressed as "above (on)" or "below (under)", it may refer to a downward direction as well as an upward direction with respect to one element.

A variable lens may be a variable focus lens. Further, a variable lens may be a lens that is adjustable in focus. A variable lens may be at least one of a liquid lens, a polymer lens, a liquid crystal lens, a VCM type, or an SMA type. A liquid lens may include a liquid lens including one liquid and a liquid lens including two liquids. A liquid lens including one liquid may change the focus by adjusting a membrane disposed at a position corresponding to the liquid, for example, by pressing the membrane using the electromagnetic force between a magnet and a coil. A liquid lens including two liquids may include a conductive liquid and a non-conductive liquid, and may adjust the interface formed between the conductive liquid and the non-conductive liquid using voltage applied to the liquid lens. A polymer lens may change the focus by controlling a polymer material using a driver such as a piezo actuator. A liquid crystal lens may change the focus by controlling a liquid crystal using electromagnetic force. A VCM type may change the focus by adjusting a solid lens or a lens assembly including a solid lens using electromagnetic force between a magnet and a coil. An SMA type may change the focus by controlling a solid lens or a lens assembly including a solid lens using a shape memory alloy.

Hereinafter, a variable lens will be described as being a liquid lens, but first and second embodiments are not limited thereto.

First Embodiment

Hereinafter, a lens module 40 or 23 and a camera module 30 including the lens module 40 or 23 according to a first embodiment will be described with reference to FIGS. 1 to 11. Hereinafter, in the description of the first embodiment, the lens module 40 or 23 will be referred to as a "liquid lens module" for convenience.

Although a liquid lens, a liquid lens module 40 or 23 including the liquid lens, a lens assembly 20 including the liquid lens module, and a camera module 30 including the lens assembly will be described using the Cartesian coordinate system (x-axis, y-axis, z-axis) for convenience, they may also be described using any of other coordinate systems. Although the x-axis, the y-axis, and the z-axis of the Cartesian coordinate system are perpendicular to each other, the embodiments are not limited thereto. That is, the x-axis, the y-axis, and the z-axis may intersect each other obliquely.

Hereinafter, an embodiment of a liquid lens included in a camera module, which performs a hand-tremor compensation or optical image stabilization (OIS) function, and an embodiment of a liquid lens module including the liquid lens will be described.

FIG. 1 is a cross-sectional view of the liquid lens module 40 according to the first embodiment.

The liquid lens module 40 shown in FIG. 1 may include a liquid lens, a first connection substrate 41, and a second connection substrate 44.

The liquid lens may include a plurality of different types of liquids LQ1 and LQ2, first to third plates 47, 45 and 46, first and second electrodes E1 and E2, and an insulation layer 48. Although not illustrated, the liquid lens may further include an optical layer.

The plurality of liquids LQ1 and LQ2 may be charged, accommodated, or disposed in a cavity CA, and may include a conductive liquid LQ1 and a non-conductive liquid (or an insulative liquid) LQ2. The two liquids LQ1 and LQ2 may be immiscible with each other, and an interface BO may be formed at a contact portion between the two liquids LQ1 and LQ2. In an example, the non-conductive liquid LQ2 may be disposed on the conductive liquid LQ1, but the embodiments are not limited thereto.

The interface BO formed by the two liquids LQ1 and LQ2 may be moved along a side portion i of the cavity CA by a driving voltage driving the liquid lens module 40. Here, the side portion i may have an inclined sectional shape, as shown in the drawings. That is, the liquid lens module 40 may perform an OIS function by electrically adjusting the tilting of the interface BO between the two types of liquids LQ1 and LQ2.

When the liquid lens module 40 shown in FIG. 1 is used for a camera module capable of performing an OIS function, the three-dimensional shape of the cavity CA accommodating the two liquids LQ1 and LQ2 may be expressed as a finite number of normal vectors, which are disposed on an optical axis LX on the plane of the Cartesian coordinate system. As such a three-dimensional shape, there may be a polygonal prism or a truncated polygonal pyramid. For example, the three-dimensional shape of the cavity CA may be any of all types of prisms and truncated pyramids, such as a triangular prism, a truncated triangular pyramid, a rectangular prism, a truncated rectangular pyramid, a pentagonal prism, and a truncated pentagonal pyramid.

Figure 2A:
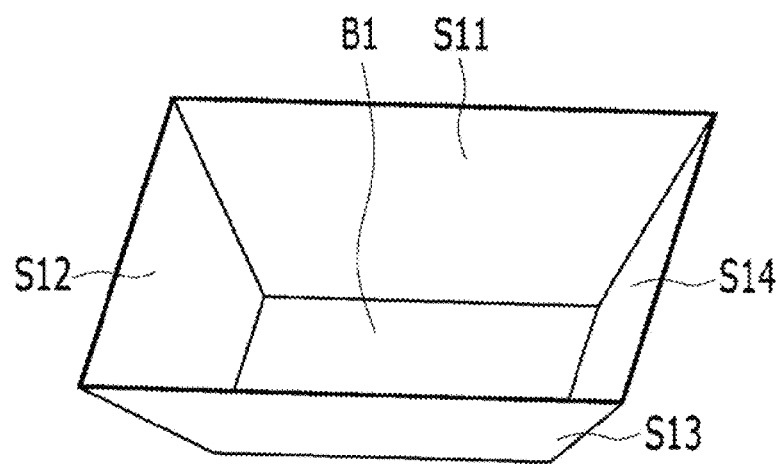
FIGS. 2A to 2C are, respectively, a perspective view, a plan view, and a right side view of an embodiment of the three-dimensional shape of a cavity in the liquid lens shown in FIG. 1.
Figure 2A:
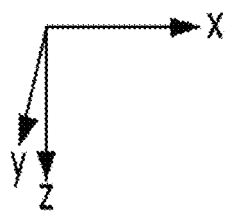
Figure 2B:
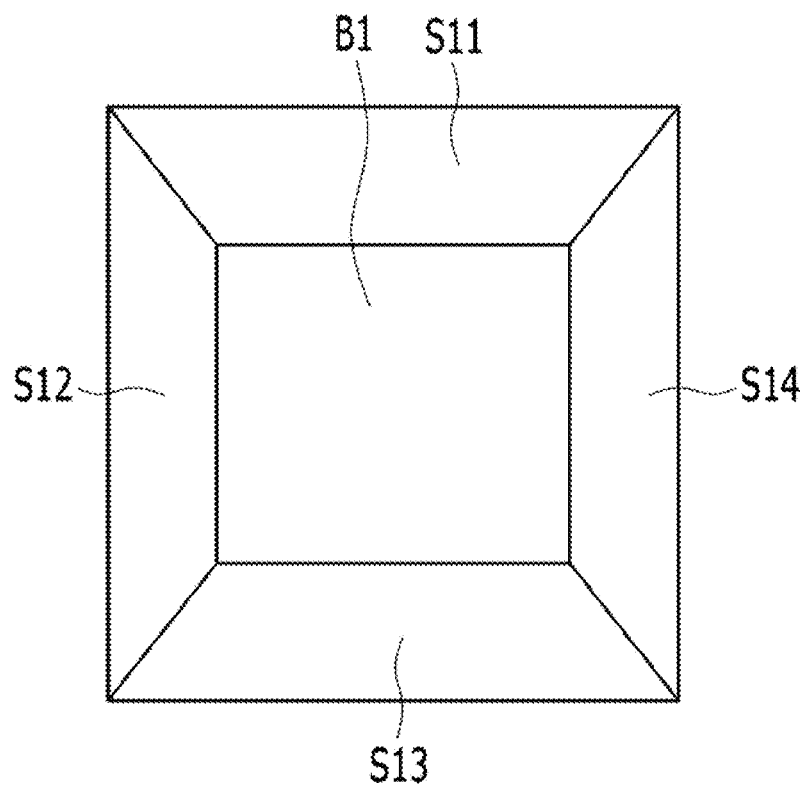
Figure 2B:
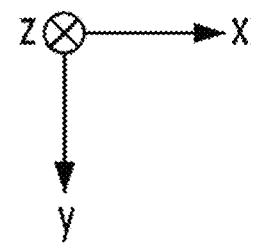
Figure 2C:
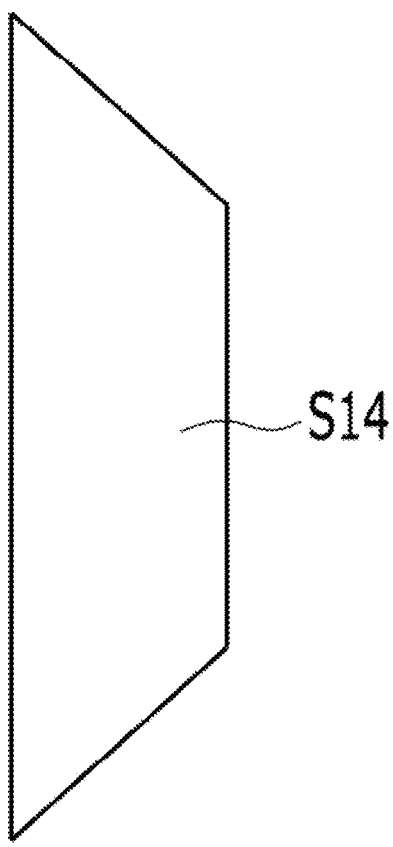
Figure 2C:
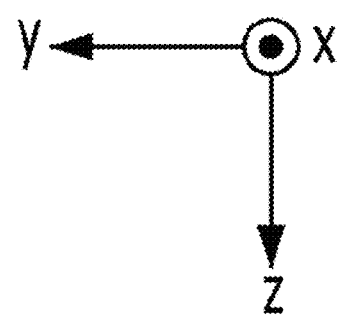

FIGS. 2A to 2C are, respectively, a perspective view, a plan view, and a right side view of an embodiment of the three-dimensional shape of the cavity CA in the liquid lens shown in FIG. 1.

According to an embodiment, as shown in FIGS. 2A to 2C, the cavity CA may have the three-dimensional shape of a truncated rectangular pyramid. In this case, the cavity CA shown in FIG. 1 may have a rectangular planar shape and a rectangular bottom shape, and side portions S11, S12, S13 and S14 of the cavity CA may have a trapezoidal shape.

Figure 3A:
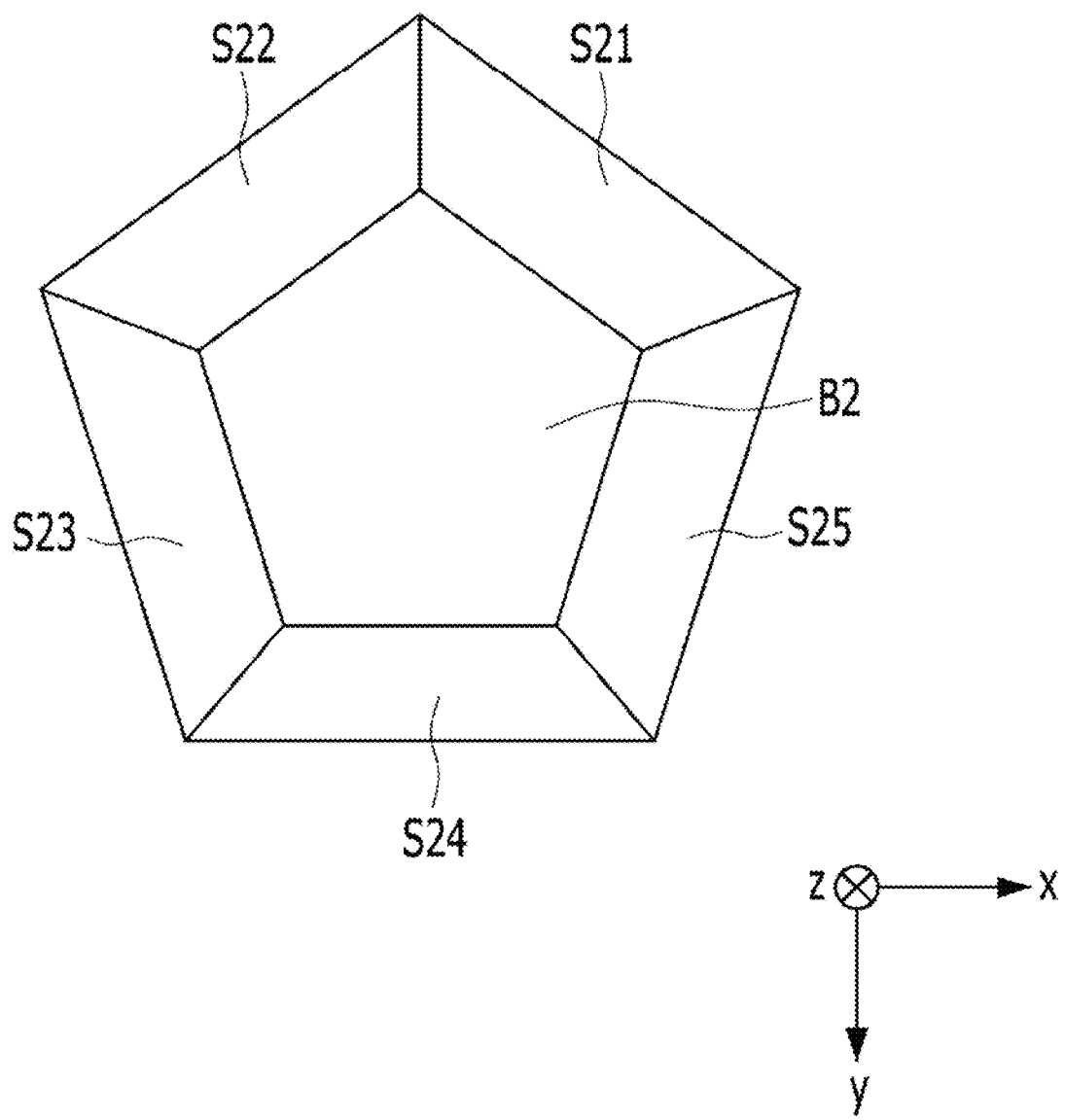
FIGS. 3A and 3B are, respectively, a plan view and a right side view of another embodiment of the three-dimensional shape of a cavity in the liquid lens shown in FIG. 1.
Figure 3B:
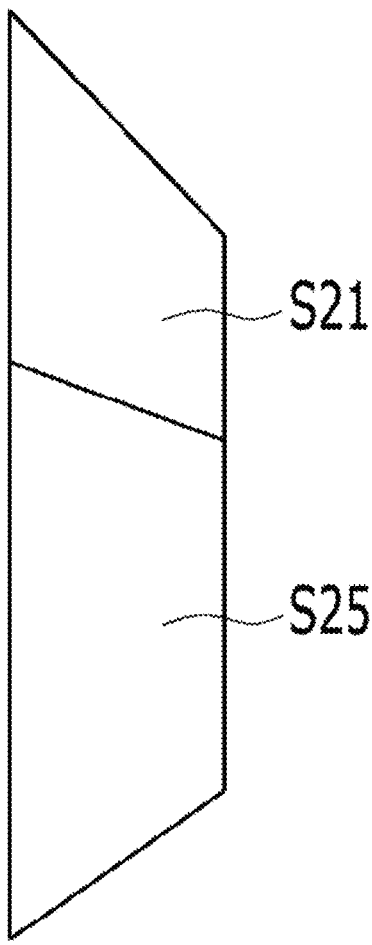
Figure 3B:
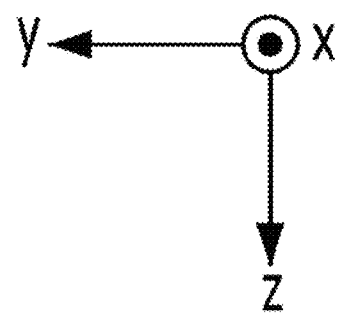

FIGS. 3A and 3B are, respectively, a plan view and a right side view of another embodiment of the three-dimensional shape of the cavity CA in the liquid lens shown in FIG. 1.

According to another embodiment, as shown in FIGS. 3A and 3B, the cavity CA may have the three-dimensional shape of a truncated pentagonal pyramid. In this case, the cavity CA shown in FIG. 1 may have a pentagonal planar shape and a pentagonal bottom shape, and side portions S21, S22, S23, S24 and S25 of the cavity CA may have a trapezoidal shape.

The cross-section of the cavity CA in the liquid lens, taken along a plane perpendicular to the optical axis LX, may have a polygonal shape. In addition, the cavity CA in the liquid lens may have a cross-sectional shape in which a finite number of normal lines pass through the optical axis LX.

As described above, when the camera module including the liquid lens module 40 shown in FIG. 1 performs only an OIS function but does not perform an AF function, the three-dimensional shape of the cavity CA accommodating the two liquids LQ1 and LQ2 may be a polygonal prism or a truncated polygonal pyramid.

The three-dimensional shape of any one of the polygonal prism or the truncated polygonal pyramid may be implemented by the first to third plates 47, 45 and 46.

FIG. 1 is a cross-sectional view of an embodiment of the liquid lens module 40 when the cavity CA has the three-dimensional shape of a truncated rectangular pyramid. However, the liquid lens module 40 may have any of various cross-sectional shapes different from that shown in FIG. 1, depending on the three-dimensional shape that the cavity CA has, among polygonal prisms or truncated polygonal pyramids, other than the truncated rectangular pyramid.

For better understanding of the embodiment, the arrangement of the first to third plates 47, 45 and 46 implementing the cavity CA having the three-dimensional shape of a truncated rectangular pyramid will be described with reference to FIGS. 1 and 2A to 2C. The cross-sectional shape of the cavity CA shown in FIG. 1 may be the shape that is apparent when the three-dimensional shape shown in FIG. 2B is viewed from the front.

The inner side surface of the first plate 47 may define the side portion i of the cavity CA. Accordingly, the side portion i of the cavity CA may have a trapezoidal shape, as shown in FIG. 1 or 2C.

The first plate 47 may include therein upper and lower openings. The first opening may correspond to one of the top portion and the bottom portion in the three-dimensional shape shown in FIG. 2A, and may be in contact with the second plate 45, and the second opening may correspond to the other one of the top portion and the bottom portion in the three-dimensional shape shown in FIG. 2A, and may be in contact with the third plate 46. Since the three-dimensional shape is a truncated rectangular pyramid, each of the first and second openings may have a rectangular shape, as shown in FIG. 2B.

The diameter of the wider opening among the first and second openings may be set in consideration of the field of view (FOV) required for the liquid lens or the role of the liquid lens in the camera module. As shown in the drawings, the size (or the area or the width) of the second opening may be greater than the size (or the area or the width) of the first opening, or vice versa.

In order to allow the light incident on the first opening in the cavity CA to pass therethrough and to be emitted to the second opening, the first plate 47 may be formed of a transparent material, or may include impurities so that light does not easily pass therethrough.

Referring to FIG. 1, electrodes may be disposed on one surface and the other surface of the first plate 47. A plurality of first electrodes E1 may be spaced apart from a second electrode E2, and may be disposed on one surface (e.g. the upper surface, the side surface, and the lower surface) of the first plate 47. The second electrode E2 may be disposed on at least a portion of the other surface (e.g. the lower surface) of the first plate 147, and may be in direct contact with the conductive liquid LQ1. To this end, a portion of the second electrode E2 may be exposed to the conductive liquid LQ1.

Further, the first electrodes E1 may be "n" individual electrodes, and the second electrode E2 may be a common electrode. Here, "n" is a positive integer of 2 or greater. For example, in the case shown in FIG. 1, "n" may be 4.

The three-dimensional shape of the cavity CA may be an n-polygonal prism or a truncated n-polygonal pyramid. That is, the number of sectional surfaces of the three-dimensional shape of the cavity CA and the number of individual electrodes may be the same as each other. For example, when the three-dimensional shape of the cavity CA is a rectangular prism or a truncated rectangular pyramid, the number of individual electrodes may be 4, and when the three-dimensional shape of the cavity CA is a pentagonal prism or a truncated pentagonal pyramid, the number of individual electrodes may be 5.

Each of the first and second electrodes E1 and E2 may be formed of a conductive material, e.g. metal.

In addition, the second plate 45 may be disposed on the first electrodes E1 and the first plate 47, and may define the bottom portion of the cavity CA shown in FIG. 2A. Specifically, the second plate 45 may be disposed on the upper surfaces of the first electrodes E1 and the cavity CA. The second plate 45 may be configured to allow the light incident on the liquid lens module 40 to enter the cavity CA in the first plate 47.

The third plate 46 may be disposed under the second electrode E2 and the first plate 47, and may define the top portion of the cavity CA shown in FIG. 2A. Specifically, the third plate 46 may be disposed under the lower surface of the second electrode E2 and the cavity CA. The third plate 46 may be configured to allow the light that has passed through the cavity CA in the first plate 47 to be emitted from the liquid lens module 40. Of course, the optical path may be changed so as to be oriented in the opposite direction such that the light is incident on the third plate 46 and emitted to the second plate 45. The third plate 46 may be in direct contact with the conductive liquid LQ1. As shown in the drawings, the third plate 46 may have a diameter greater than the diameter of the wider opening among the first and second openings in the first plate 47.

The second plate 45 and the third plate 46 may be disposed so as to face each other, with the first plate 47 interposed therebetween. In addition, at least one of the second plate 45 or the third plate 46 may be omitted.

Each of the second and third plates 45 and 46 may be an area through which light passes, and may be formed of a light-transmissive material. For example, each of the second and third plates 45 and 46 may be formed of glass, and, for convenience of processing, may be formed of the same material.

As described above, the cavity CA having the three-dimensional shape of a truncated rectangular pyramid may be implemented by an area surrounded by the side portion i of the first plate 47, the first opening contacting the second plate 45, and the second opening contacting the third plate 46.

Meanwhile, the insulation layer 48 may be disposed so as to cover a portion of the lower surface of the second plate 45 in the cavity CA. That is, the insulation layer 48 may be disposed between the non-conductive liquid LQ2 and the second plate 45.

In addition, the insulation layer 48 covers one electrode among the first and second electrodes E1 and E2 (e.g. the first electrodes E1), and exposes a portion of the other electrode (e.g. the second electrode E2).

For example, the insulation layer 48 may be disposed so as to cover portions of the first electrodes E1, which are disposed on the side portion i of the cavity CA. Also, the insulation layer 48 may be disposed on the lower surface of the first plate 47 so as to cover portions of the first electrodes E1 and the first plate 47. Accordingly, the first electrodes E1 and the liquids LQ1 and LQ2 may be electrically separated from each other by the insulation layer 48. In addition, the insulation layer 48 may be disposed so as to cover a portion of the second electrode E2 and to expose the remaining portion of the second electrode E2. Accordingly, electrical energy may be applied to the conductive liquid LQ1 through the second electrode E2.

Meanwhile, at least one substrate, e.g. the first connection substrate 41 and the second connection substrate 44, serves to supply voltage to the liquid lens. To this end, the plurality of first electrodes E1 may be electrically connected to the first connection substrate 41, and the second electrode E2 may be electrically connected to the second connection substrate 44.

The tilting of the interface BO between the conductive liquid LQ1 and the non-conductive liquid LQ2 may be adjusted by applying a driving voltage to the first and second electrodes E1 and E2 through the first connection substrate 41 and the second connection substrate 44, whereby the liquid lens, a lens assembly including the liquid lens, a camera module including the lens assembly, and an optical instrument may perform an OIS function.

The first connection substrate 41 may transmit "n" different individual voltages to the liquid lens through the first electrodes E1, and the second connection substrate 44 may transmit a common voltage to the liquid lens through the second electrode E2. The common voltage may include a DC voltage or an AC voltage, and when the common voltage is applied in a pulse form, the width of the pulse or the duty cycle thereof may be uniform.

Although not illustrated, a conductive epoxy may be disposed between the first connection substrate 41 and the plurality of first electrodes E1, whereby the first connection substrate 41 and the plurality of first electrodes E1 may be in contact with, coupled to, and electrically connected to each other. In addition, a conductive epoxy may be disposed between the second connection substrate 44 and the second electrode E2, whereby the second connection substrate 44 and the second electrode E2 may be in contact with, coupled to, and electrically connected to each other.

As long as the liquid lens according to the embodiment can be accommodated in the cavity CA having the three-dimensional shape of a polygonal prism or a polygonal pyramid, the liquid lens module 40 according to the embodiment may have any of various cross-sectional shapes, unlike what is shown in FIG. 1. That is, as long as the liquid lens according to the embodiment can be accommodated in the cavity CA having the three-dimensional shape of a polygonal prism or a polygonal pyramid, the liquid lens module 40 according to the embodiment is not limited to the specific material, the specific arrangement, or the specific number (n) of the first and second electrodes E1 and E2, the specific connection structure between the first and second connection substrates 41 and 44 and the first and second electrodes E1 and E2, or the specific material or the specific arrangement of the first and second connection substrates 41 and 44.

Figure 4:
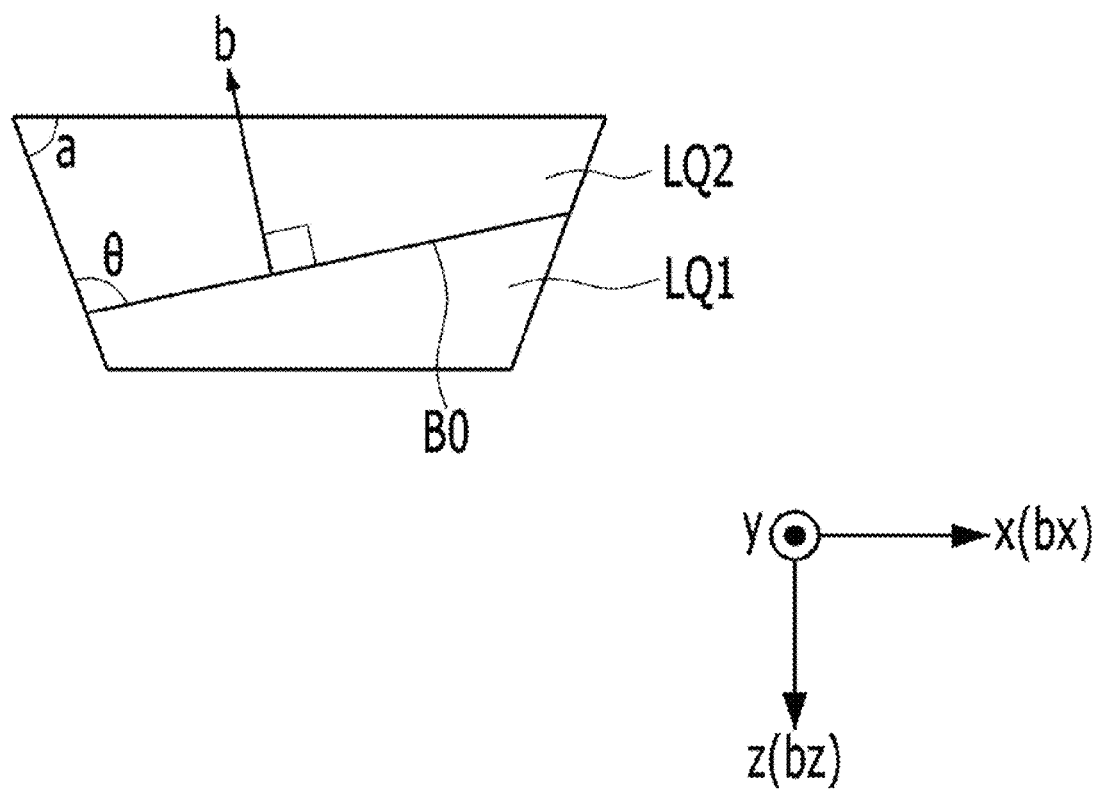
FIG. 4 shows the cross-sectional shape of a side portion of the cavity.

FIG. 4 shows the cross-sectional shape of the side portion of the cavity CA.

The sectional surface shown in FIG. 4 may correspond to any one of the sectional surfaces S11, S12, S13 and S14 shown in FIGS. 2A to 2C or the sectional surfaces S21, S22, S23, S24 and S25 shown in FIGS. 3A and 3B.

In FIG. 4, $\theta$ represents the contact angle of the liquid interface BO, i.e. the angle formed between the sectional surface of the three-dimensional shape of the cavity CA and the interface BO. At this time, when the sectional surface shown in FIG. 4 corresponds to the sectional surface S11 shown in FIG. 2A, the contact angle $\theta$ is denoted by $\theta 1$. When the sectional surface shown in FIG. 4 corresponds to the sectional surface S12 shown in FIG. 2A, the contact angle $\theta$ is denoted by $\theta 2$. When the sectional surface shown in FIG. 4 corresponds to the sectional surface S13 shown in FIG. 2A, the contact angle $\theta$ is denoted by $\theta 3$. When the sectional surface shown in FIG. 4 corresponds to the sectional surface S14 shown in FIG. 2A, the contact angle $\theta$ is denoted by $\theta 4$.

In addition, when the normal vector of the interface BO is denoted by "b" in FIG. 4, it may be expressed using Equation 1 below.

$$b = (\sin(bx)\cdot\sin(bz),\ \cos(bx)\cdot\sin(bz),\ \cos(bz)) \quad [\text{Equation 1}]$$

Here, bx represents the x-axis component of the vector b, by represents the y-axis component of the vector b, and bz represents the z-axis component of the vector b. For better understanding, in FIG. 4, the x-axis component bx and the z-axis component bz of the normal vector b are written on the right side of the orthogonal coordinate system.

Also, for example, when the cavity CA has the three-dimensional shape of a truncated rectangular pyramid, as shown in FIGS. 2A to 2C, the normal vectors S1, S2, S3 and S4 in the respective sectional surfaces S11, S12, S13 and S14 may be expressed using Equation 2 below.

$$S1 = (\cos(90-a), 0, \sin(90-a)),$$

$$S2 = (0, \cos(90-a), \sin(90-a)),$$

$$S3 = (-\cos(90-a), 0, \sin(90-a)),$$

$$S4 = (0, -\cos(90-a), \sin(90-a)) \quad [\text{Equation 2}]$$

Here, "a" represents the angle at which the three-dimensional shape of the cavity CA is tilted.

The contact angle θ in each sectional surface may be adjusted so that the interface BO shown in FIG. 4 becomes flat, rather than becoming convex.

For example, when the cavity has the three-dimensional shape of a truncated rectangular pyramid, as shown in FIGS. 2A to 2C, a driving voltage may be applied to the liquid lens in order to make the interface BO flat, and at this time, the contact angles θ1, θ2, θ3 and θ4 in the respective sectional surfaces S11, S12, S13 and S14 may be expressed using Equation 3 below.

θ1=a cos(cos(90−a)·sin(bx)·sin(bz)+sin(90−a)·cos(bz))

θ2=a cos(cos(90−a)·cos(bx)·sin(bz)+sin(90−a)·cos(bz))

θ3=a cos(−cos(90−a)·sin(bx)·sin(bz)+sin(90−a)·cos(bz))

θ4=a cos(−cos(90−a)·cos(bx)·sin(bz)+sin(90−a)·cos(bz))  [Equation 3]

In addition, when the cavity has the three-dimensional shape of a truncated rectangular pyramid, as shown in FIGS. 2A to 2C, the contact angles θ1, θ2, θ3 and θ4 in the respective sectional surfaces S11, S12, S13 and S14, the angle a at which the three-dimensional shape is tilted, the z-axis component bz of the vector b, and the x-axis component bx of the vector b may have relationships therebetween as shown in Table 1 below.

TABLE 1

| bz | bx | a | Θ1 | Θ2 | Θ3 | Θ4 |
|----|----|----|------|------|------|------|
| 0  | 0  | 90 | 90   | 90   | 90   | 90   |
| 10 | 0  | 90 | 90   | 80   | 90   | 100  |
| 10 | 45 | 90 | 82.9 | 82.9 | 97.1 | 97.1 |
| 10 | 30 | 90 | 85   | 81   | 95   | 98.6 |
| 0  | 0  | 60 | 60   | 60   | 60   | 60   |
| 10 | 0  | 60 | 60.5 | 50   | 60.5 | 70   |
| 10 | 45 | 60 | 53.2 | 53.2 | 67.3 | 67.3 |
| 10 | 30 | 60 | 55.4 | 51.5 | 65.3 | 68.8 |

It has been described above that, when a camera module including the liquid lens module 40 according to the embodiment shown in FIG. 1 described above performs an OIS function, the cavity CA accommodating the two liquids LQ1 and LQ2 in the liquid lens has the three-dimensional shape of a polygonal prism or a truncated polygonal pyramid.

Figure 5A:
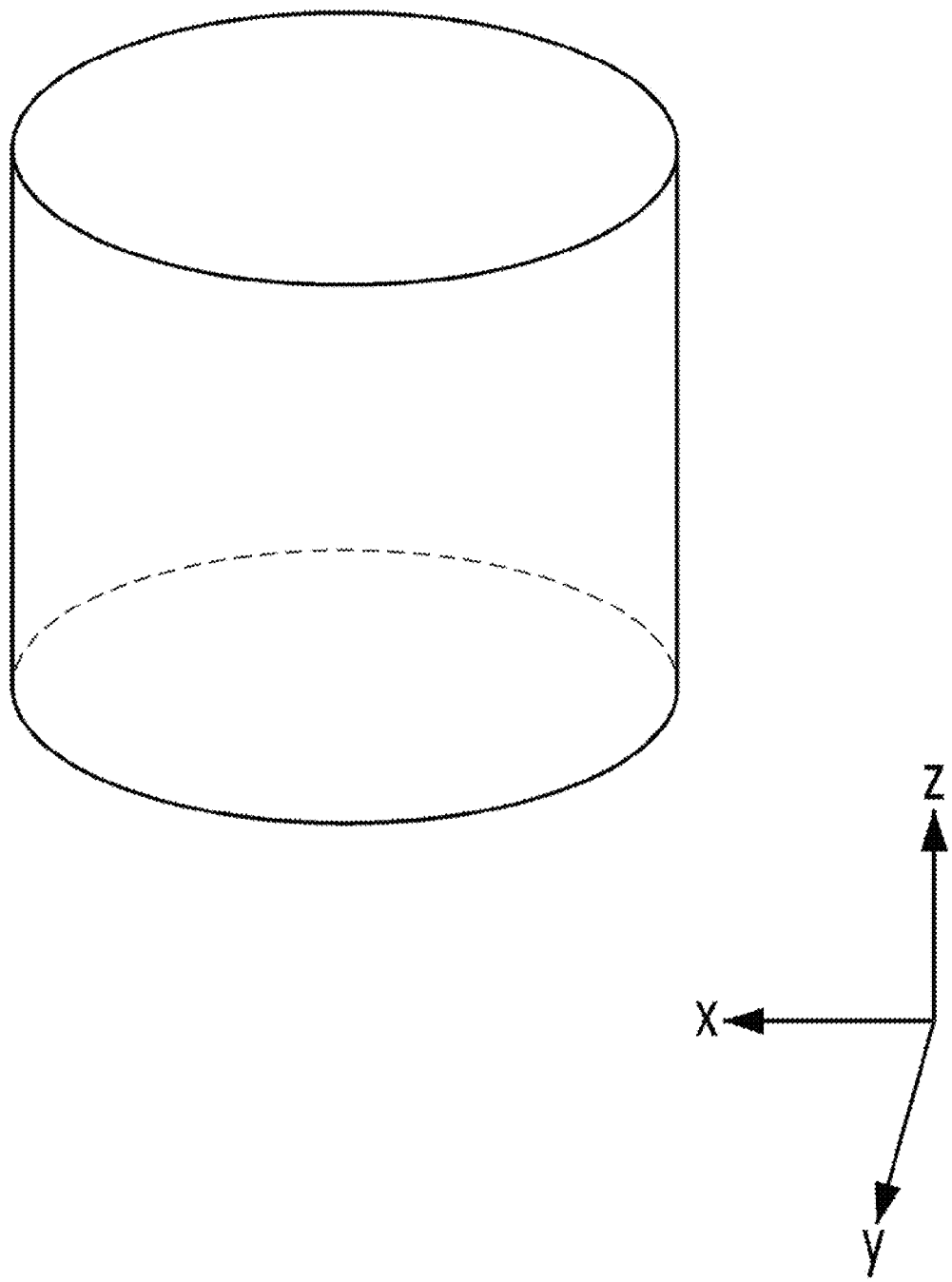
FIGS. 5A and 5B show the three-dimensional shape of the cavity in which two liquids are charged, accommodated, or disposed in the liquid lens module according to the embodiment shown in FIG. 1.
Figure 5B:
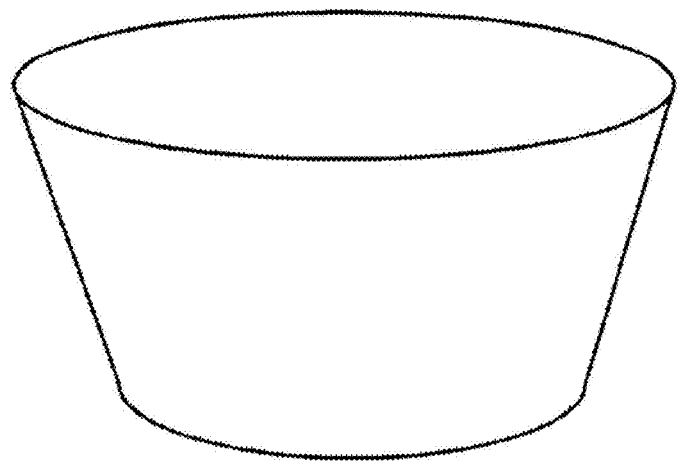
Figure 5B:
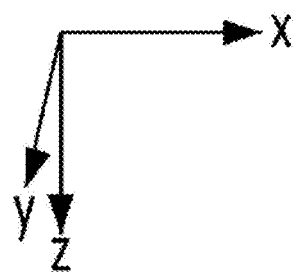
Figure 6:
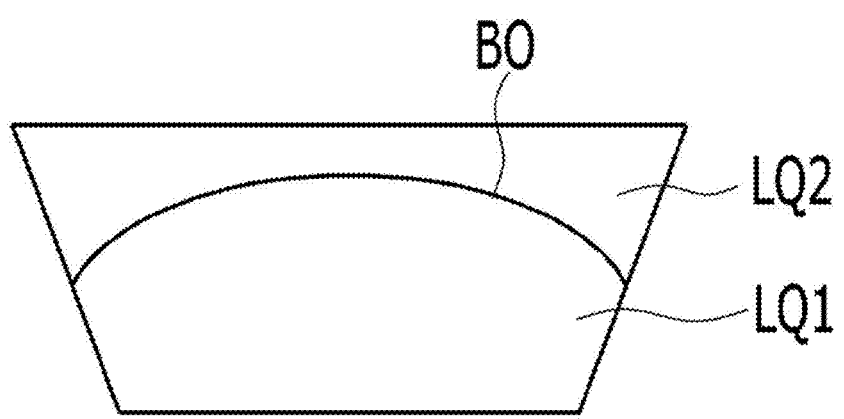
FIG. 6 is a cross-sectional view of the two liquid lenses charged, accommodated, or disposed in the cavity having the three-dimensional shape shown in FIG. 5B.

FIGS. 5A and 5B show the three-dimensional shape of the cavity CA in which the two liquids LQ1 and LQ2 are charged, accommodated, or disposed in the liquid lens module 40 according to the embodiment shown in FIG. 1, and FIG. 6 is a cross-sectional view of the two liquid lenses LQ1 and LQ2 charged, accommodated, or disposed in the cavity having the three-dimensional shape shown in FIG. 5B.

If the liquid lens module 40 shown in FIG. 1 is used for a camera module that performs an AF function, the three-dimensional shape of the cavity CA accommodating the two liquids LQ1 and LQ2 in the liquid lens may be a cylindrical shape, as shown in FIG. 5A, or may be a truncated cone shape, as shown in FIG. 5B. In addition, the cross-sectional shape of the cavity CA in the liquid lens, taken in a horizontal direction that is perpendicular to the optical axis LX, may be a circular shape, or the cavity CA in the liquid lens may have a cross-sectional shape in which an infinite number of normal lines pass through the optical axis LX. In this case, the curvature of the interface BO between the conductive liquid LQ1 and the non-conductive liquid LQ2 may be adjusted, as shown in FIG. 6, by applying a driving voltage to the first and second electrodes E1 and E2 through the first connection substrate 41 and the second connection substrate 44, whereby the liquid lens, a lens assembly including the liquid lens, a camera module including the lens assembly, and an optical instrument may perform an auto-focusing (AF) function.

As a result, according to the embodiment, when the liquid lens module 40 shown in FIG. 1 is used for a camera module that performs an OIS function, the cavity CA has the three-dimensional shape of a polygonal prism or a truncated polygonal pyramid. On the other hand, when the liquid lens module 40 shown in FIG. 1 is used for a camera module that performs an AF function, the cavity CA has the three-dimensional shape of a cylinder or a truncated cone.

Hereinafter, embodiments of a liquid lens module included in a camera module that performs both an AF function and an OIS function will be described.

FIGS. 7A to 7E are cross-sectional views of liquid lens modules according to embodiments.

A liquid lens module according to an embodiment may include a liquid lens and first and second connection substrates, and the liquid lens may include first liquids, second liquids, individual electrodes, a common electrode, a plurality of plates, and an insulation layer.

The first liquids may be charged, accommodated, or disposed in a first cavity CA1. The second liquids may be charged, accommodated, or disposed in a second cavity CA2. The first and second cavities CA1 and CA2 may be disposed so as to vertically overlap each other on the optical axis LX. That is, the second cavity CA2 may be disposed on the first cavity CA1 on the optical axis LX.

According to the embodiment, one of the first and second cavities CA1 and CA2 may have the three-dimensional shape of a polygonal prism or a truncated polygonal pyramid, and the other one of the first and second cavities CA1 and CA2 may have the three-dimensional shape of a cylinder or a truncated cone. That is, in the case of a liquid lens according to another embodiment, the liquids accommodated in the cavity having the three-dimensional shape of a polygonal prism or a truncated polygonal pyramid, among the first and second cavities CA1 and CA2, are used exclusively for OIS, and the liquids accommodated in the cavity having the three-dimensional shape of a cylinder or a truncated cone, among the first and second cavities CA1 and CA2, are used exclusively for AF.

Figure 7A:
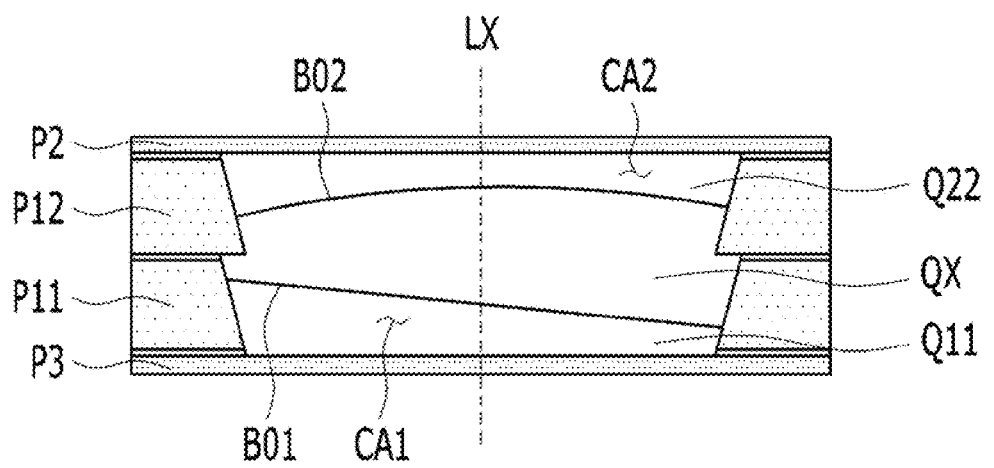
FIGS. 7A to 7E are cross-sectional views of liquid lens modules according to embodiments.
Figure 7A:
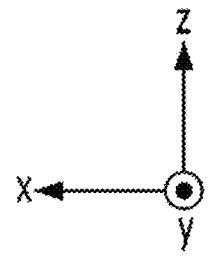
Figure 7B:
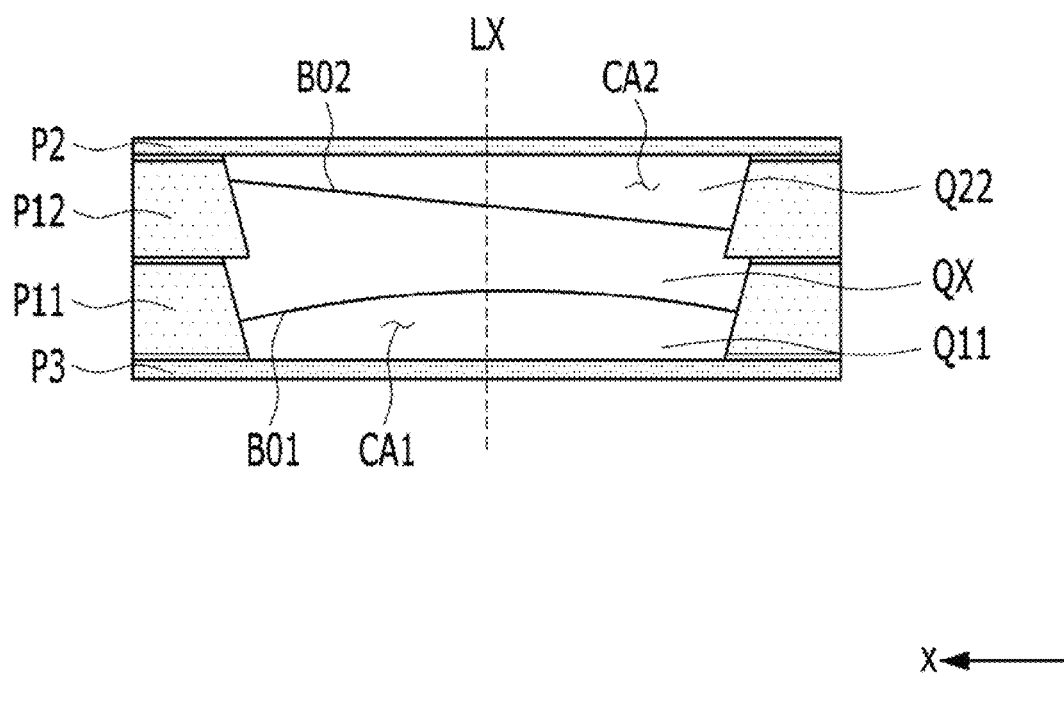
Figure 7C:
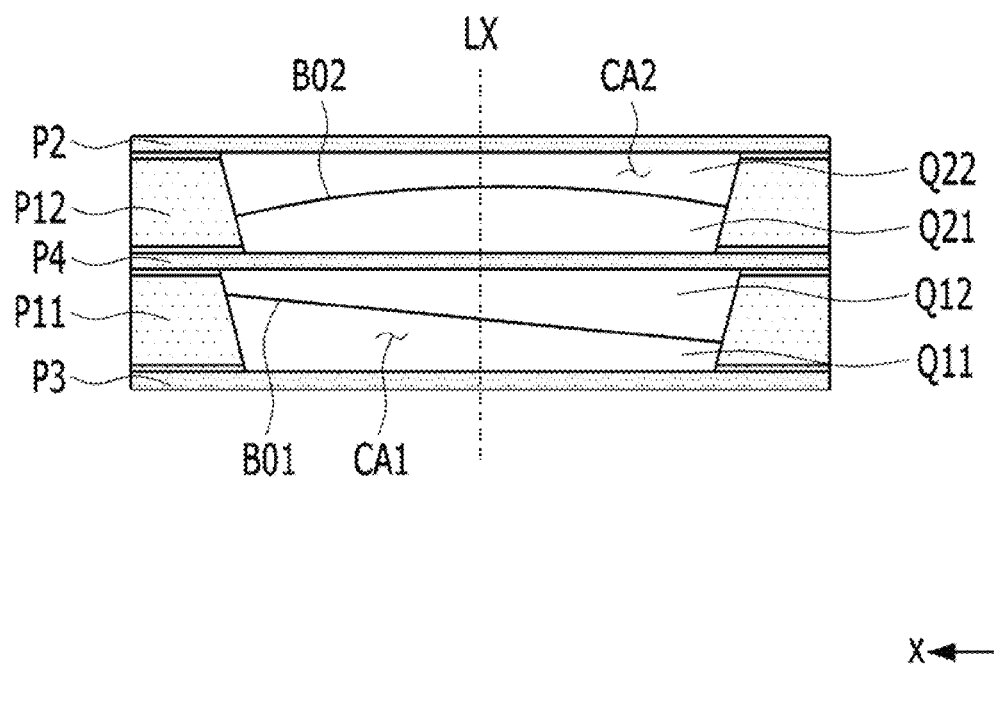
Figure 7D:
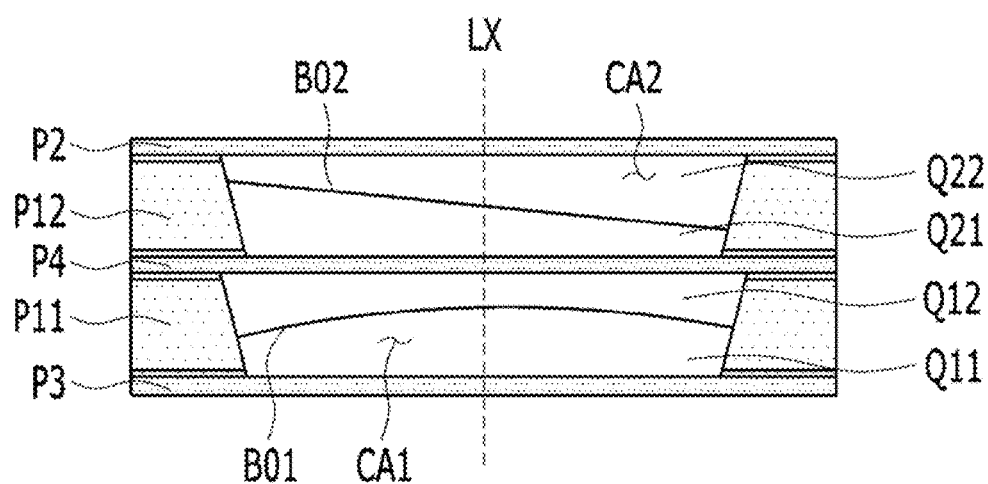
Figure 7D:
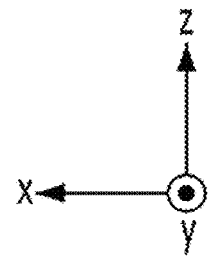
Figure 7E:
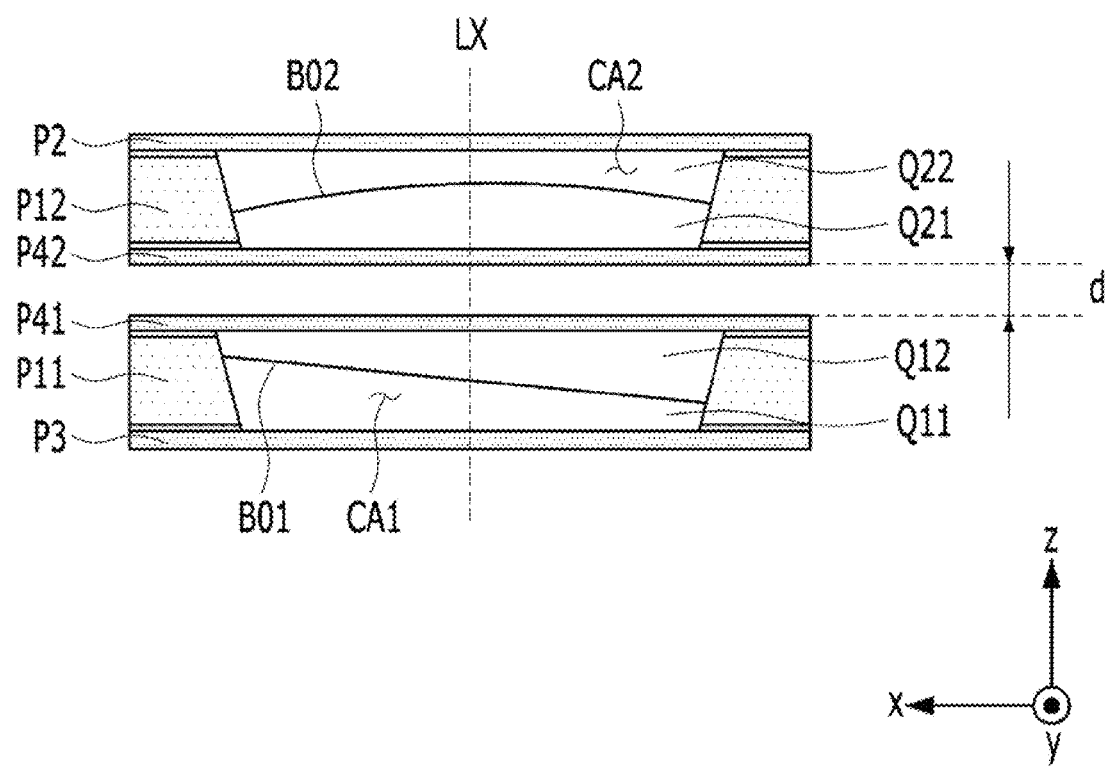

For example, as shown in FIG. 7A, 7C or 7E, the first cavity CA1 may have the three-dimensional shape of a polygonal prism or a truncated polygonal pyramid, and the second cavity CA2 may have the three-dimensional shape of a cylinder or a truncated cone. In this case, the angle at which the interface BO1 between the first liquids Q11 and Q12 accommodated in the first cavity CA1 is tilted may be adjusted in order to perform an OIS function, and the curvature of the interface BO2 between the second liquids Q21 and Q22 accommodated in the second cavity CA2 may be adjusted in order to perform an AF function.

Alternatively, as shown in FIG. 7B or 7D, the first cavity CA1 may have the three-dimensional shape of a cylinder or a truncated cone, and the second cavity CA2 may have the three-dimensional shape of a polygonal prism or a truncated polygonal pyramid. In this case, the curvature of the interface BO1 between the first liquids Q11 and Q12 accommodated in the first cavity CA1 may be adjusted in order to perform an AF function, and the angle at which the interface BO2 between the second liquids Q21 and Q22 accommodated in the second cavity CA2 is tilted may be adjusted in order to perform an OIS function.

The first liquids charged, accommodated, or disposed in the first cavity CA1 may include different types of 1-1st and 1-2nd liquids Q11 and Q12. One of the 1-1st and 1-2nd liquids Q11 and Q12 may be electrically conductive, and the other one thereof may be electrically insulative. The 1-1st liquid Q11 may be disposed under the 1-2nd liquid Q12, and the 1-2nd liquid Q12 may be disposed on the 1-1st liquid Q11.

Similarly, the second liquids charged, accommodated, or disposed in the second cavity CA2 may include different types of 2-1st and 2-2nd liquids Q21 and Q22. One of the 2-1st and 2-2nd liquids Q21 and Q22 may be electrically conductive, and the other one thereof may be electrically insulative. The 2-1st liquid Q21 may be disposed under the 2-2nd liquid Q22, and the 2-2nd liquid Q22 may be disposed on the 2-1st liquid Q21.

The electrically conductive liquids among the 1-1st to 2-1st liquids Q11, Q12, Q21 and Q22 may have the same characteristics as the conductive liquid LQ1 shown in FIG. 1, and the electrically insulative liquids among the 1-1st to 2-1st liquids Q11, Q12, Q21 and Q22 may have the same characteristics as the non-conductive liquid LQ2 shown in FIG. 1.

According to the embodiment, as shown in FIG. 7A or 7B, the first cavity CA1 and the second cavity CA2 may communicate with each other. In this case, the 1-2nd liquid Q12 and the 2-1st liquid Q21 may be integrated. In FIGS. 7A and 7B, QX represents a liquid in which the 1-2nd liquid Q12 and the 2-1st liquid Q21 are integrated. In this case, the 1-1st liquid Q11 and the 2-2nd liquid Q22 may be the same type of liquid, or may be different types of liquids.

Further, in FIGS. 7A and 7B, the 1-1st liquid Q11 and the 2-2nd liquid Q22 may be conductive liquids, and the Xth liquid QX may be a non-conductive liquid. Alternatively, the 1-1st liquid Q11 and the 2-2nd liquid Q22 may be non-conductive liquids, and the Xth liquid QX may be a conductive liquid.

Further, in each of FIGS. 7C and 7E, one of the 1-1st liquid Q11 and the 1-2nd liquid Q12 may be a conductive liquid, and the other one thereof may be a non-conductive liquid. One of the 2-1st liquid Q21 and 2-2nd liquid Q22 may be a conductive liquid, and the other one thereof may be a non-conductive liquid. Accordingly, various combinations of the conductive liquids and the non-conductive liquids are possible in the optical-axis direction, and the embodiments are not limited to any specific form in which the conductive and non-conducive liquids, among the four liquids Q11, Q12, Q21 and Q22, are stacked on the optical axis.

In addition, the plurality of plates included in the liquid lens may include a 1-1st plate P11, a 1-2nd plate P12, a second plate P2, and a third plate P3.

The 1-1st plate P11 defines a side portion of the first cavity CA1. The 1-2nd plate P12 defines a side portion of the second cavity CA2, and is disposed on the 1-1st plate P11. Here, each of the 1-1st and 1-2nd plates P11 and P12 performs the same function as the first plate 47 shown in FIG. 1.

The second plate P2 may be disposed on the 1-2nd plate P12. The third plate P3 may be disposed under the 1-1st plate P11.

In addition, as shown in FIGS. 7C to 7E, the plurality of plates may further include a fourth plate P4. The fourth plate P4 may be disposed between the first cavity CA1 and the second cavity CA2. The fourth plate P4 may be formed of a transparent material, e.g. glass.

As shown in FIG. 7E, the fourth plate P4 may further include a 4-1st plate P41 and a 4-2nd plate P42. The 4-1st plate P41 may be disposed on the 1-2nd liquid Q12 and the 1-1st plate P11, and the 4-2nd plate P42 may be disposed under the 2-1st liquid Q21 and the 1-2nd plate P12.

As shown in FIGS. 7C and 7D, the 4-1st plate P41 and the 4-2nd plate P42 may be integrated. Alternatively, as shown in FIG. 7E, the 4-1st plate P41 and the 4-2nd plate P42 may be disposed so as to be spaced apart from each other by a predetermined distance d in the optical-axis direction. Here, the shorter the predetermined distance d, the more preferable. If the distance d increases, the width of the light entering the camera module at each position increases, and the width and thickness of the liquid lens also increase, leading to an increase in the overall size of the camera module.

In each of FIGS. 7A and 7B, the 1-1st plate P11 and the third plate P3 respectively perform the same functions as the first plate 47 and the third plate 46 shown in FIG. 1. In addition, the 1-2nd plate P12 and the second plate P2 respectively perform the same functions as the first plate 47 and the second plate 45 shown in FIG. 1.

In each of FIGS. 7C and 7D, the 1-1st plate P11, the fourth plate P4, and the third plate P3 respectively perform the same functions as the first plate 47, the second plate 45, and the third plate 46 shown in FIG. 1. In addition, the 1-2nd plate P12, the second plate P2, and the fourth plate P4 respectively perform the same functions as the first plate 47, the second plate 45, and the third plate 46 shown in FIG. 1.

In addition, in FIG. 7E, the 1-1st plate P11, the 4-1st plate P41, and the third plate P3 respectively perform the same functions as the first plate 47, the second plate 45, and the third plate 46 shown in FIG. 1. In addition, the 1-2nd plate P12, the second plate P2, and the 4-2nd plate P42 respectively perform the same functions as the first plate 47, the second plate 45, and the third plate 46 shown in FIG. 1.

Further, in the liquid lens module according to the embodiments shown in FIGS. 7A to 7E, the individual electrodes, the common electrode, the insulation layer, and the first and second connection substrates are not specifically illustrated. The reason for this that the individual electrodes, the common electrode, the insulation layer, and the first and second connection substrates may be variously disposed depending on combinations of electrically conducive liquids and electrically insulative liquids, among the 1-1st liquid Q11, the 1-2nd liquid Q12, the 2-1st liquid Q21, and the 2-2nd liquid Q22.

According to an embodiment, the individual electrodes, the common electrode, and the insulation layer may be disposed as follows, irrespective of the combinations of electrically conducive liquids and electrically insulative liquids, among the 1-1st liquid Q11, the 1-2nd liquid Q12, the 2-1st liquid Q21, and the 2-2nd liquid Q22.

The individual electrodes may be disposed on the side portions of the 1-1st plate P11 and the 1-2nd plate P12. In addition, the common electrode may be disposed on at least one of the side portion, the upper surface, or the lower surface of at least one of the 1-1st plate P11 or the 1-2nd plate P12. In addition, the insulation layer may be disposed so as to electrically separate the individual electrodes from the 1-1st liquid Q11, the 1-2nd liquid Q12, the 2-1st liquid Q21, and the 2-2nd liquid Q22. In addition, the insulation layer may be disposed such that electrically conductive liquids among the 1-1st liquid Q11, the 1-2nd liquid Q12, the 2-1st liquid Q21, and the 2-2nd liquid Q22 are electrically connected to the common electrode.

For example, in each of FIGS. 7C and 7D, when the first cavity CA1, the 1-1st plate PI1, the fourth plate P4, the third plate P3, the 1-1st liquid Q11, and the 1-2nd liquid Q12 respectively correspond to the cavity CA, the first plate 47, the second plate 45, the third plate 46, the liquid LQ1, and the liquid LQ2 shown in FIG. 1, the individual electrodes, the common electrode, the insulation layer, and the first and second connection substrates may be disposed as shown in FIG. 1 on the 1-1st plate P11, the fourth plate P4, and the third plate P3. In addition, when the second cavity CA2, the 1-2nd plate P12, the second plate P2, the fourth plate P4, the 2-1st liquid Q21, and the 2-2nd liquid Q22 respectively correspond to the cavity CA, the first plate 47, the second plate 45, the third plate 46, the liquid LQ1, and the liquid LQ2 shown in FIG. 1, the individual electrodes, the common electrode, the insulation layer, and the first and second connection substrates may be disposed as shown in FIG. 1 on the 1-2nd plate P12, the second plate P2, and the fourth plate P4.

For example, referring to FIG. 7E, when the first cavity CA1, the I-1st plate P11, the 4-1st plate P41, the third plate P3, the 1-1st liquid Q11, and the 1-2nd liquid Q12 respectively correspond to the cavity CA, the first plate 47, the second plate 45, the third plate 46, the liquid LQ1, and the liquid LQ2 shown in FIG. 1, the individual electrodes, the common electrode, the insulation layer, and the first and second connection substrates may be disposed as shown in FIG. 1 on the 1-1st plate P11, the 4-1st plate P41, and the third plate P3. In addition, when the second cavity CA2, the 1-2nd plate P12, the second plate P2, the 4-2nd plate P42, the 2-1st liquid Q21, and the 2-2nd liquid Q22 respectively correspond to the cavity CA, the first plate 47, the second plate 45, the third plate 46, the liquid LQ1, and the liquid LQ2 shown in FIG. 1, the individual electrodes, the common electrode, the insulation layer, and the first and second connection substrates may be disposed as shown in FIG. 1 on the 1-2nd plate P12, the second plate P2, and the 4-2nd plate P42.

Hereinafter, a lens assembly including the liquid lens module according to the above-described embodiment will be described with reference to the accompanying drawings.

Figure 8:
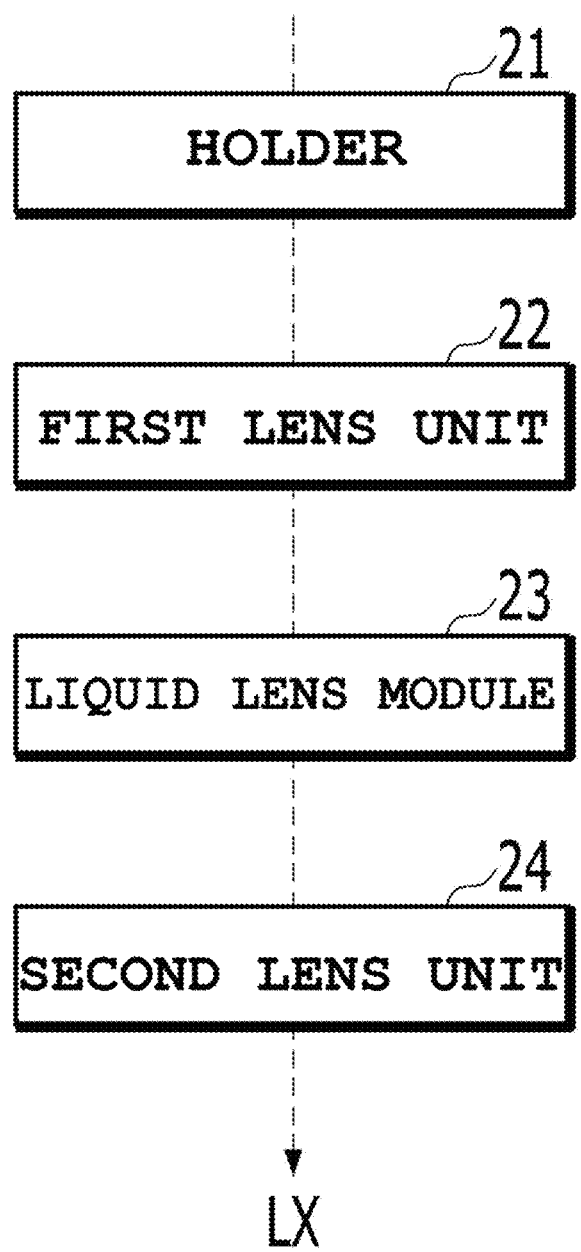
FIG. 8 is an exploded diagram of a lens assembly including the liquid lens module according to the first embodiment.

FIG. 8 is an exploded diagram of a lens assembly 20 including the liquid lens module 40 according to the first embodiment.

The lens assembly 20 shown in FIG. 8 may include at least one of a holder 21, a first lens unit 22, a liquid lens module 23, and a second lens unit 24.

The liquid lens module 23 may be the liquid lens module 40 shown in FIG. 1, which includes the cavity CA having the three-dimensional shape of a polygonal prism or a truncated polygonal pyramid, as shown in FIGS. 2A to 2C or FIGS. 3A and 3B. Alternatively, the liquid lens module 23 may be any one of the liquid lens modules shown in FIGS. 7A to 7E.

The liquid lens module 23 may include first and second lenses.

The first lens may include a first plate, having a first cavity, and a first liquid, disposed in the first cavity. The first cavity in the first lens may have a cross-sectional shape in which a finite number of normal lines pass through the optical axis. The first lens may be controlled so as to correct shaking.

The second lens may overlap the first lens in the optical-axis direction, and may include a second plate, having a second cavity, and a second liquid, disposed in the second cavity. The second cavity in the second lens may have a cross-sectional shape in which an infinite number of normal lines pass through the optical axis. The second lens may be controlled so as to adjust the focus.

The first lens unit 22 may be disposed at the upper side of the liquid lens module 23, and may be a region on which light is incident from outside the lens assembly 20. That is, the first lens unit 22 may be disposed above the liquid lens module 23 within the holder 21. The first lens unit 22 may be implemented using a single lens, or may be implemented using two or more lenses that are aligned along a center axis to form an optical system. Here, the center axis may be the optical axis LX of the optical system, which is formed by the first lens unit 22, the liquid lens module 23, and the second lens unit 24, or may be an axis parallel to the optical axis LX. The optical axis LX may correspond to the optical axis of an image sensor 34 included in a camera module 30, which will be described later. That is, the first lens unit 22, the liquid lens module 23, the second lens unit 24, and the image sensor 34 may be aligned along the optical axis LX through active alignment (AA).

The second lens unit 24 may be disposed below the liquid lens module 23 within the holder 21. The second lens unit 24 may be disposed so as to be spaced apart from the first lens unit 22 in the optical-axis direction (e.g. in the z-axis direction). The second lens unit 24 may be implemented using a single lens, or may be implemented using two or more lenses, which are aligned along the center axis to form an optical system.

The light introduced into the first lens unit 22 from outside the lens assembly 20 may pass through the liquid lens module 23, and may enter the second lens unit 24. Unlike the liquid lens module 23, each of the first lens unit 22 and the second lens unit 24 may be a solid lens formed of glass or plastic, but the embodiments are not limited to any specific material of each of the first lens unit 22 and the second lens unit 24. Alternatively, at least one of the first lens unit 22 or the second lens unit 24 may be omitted. Alternatively, unlike what is illustrated in FIG. 8, the liquid lens module 23 may be disposed above the first lens unit 22 or below the second lens unit 24.

The holder 21 serves to allow the first lens unit 22, the liquid lens module 23, and the second lens unit 24 to be accommodated in, mounted in, seated in, in contact with, fixed to, provisionally fixed to, supported by, coupled to, or disposed in the holder. The first lens unit 22 and the second lens unit 24 may be accommodated in the holder 21. A part of the liquid lens module 23 may be accommodated in the holder 21, and the remaining part thereof may protrude outside the holder 21. The reason for this is to electrically connect the first and second connection substrates 41 and 44 of the liquid lens module 23 to a main board 35, which will be described later with reference to FIG. 9. Through the connection of the first and second connection substrates 41 and 44 to the main board 35, the liquid lens module 23 may receive a driving voltage for driving from the main board 35.

Hereinafter, a camera module including the liquid lens module according to the embodiment will be described with reference to the accompanying drawings.

Figure 9:
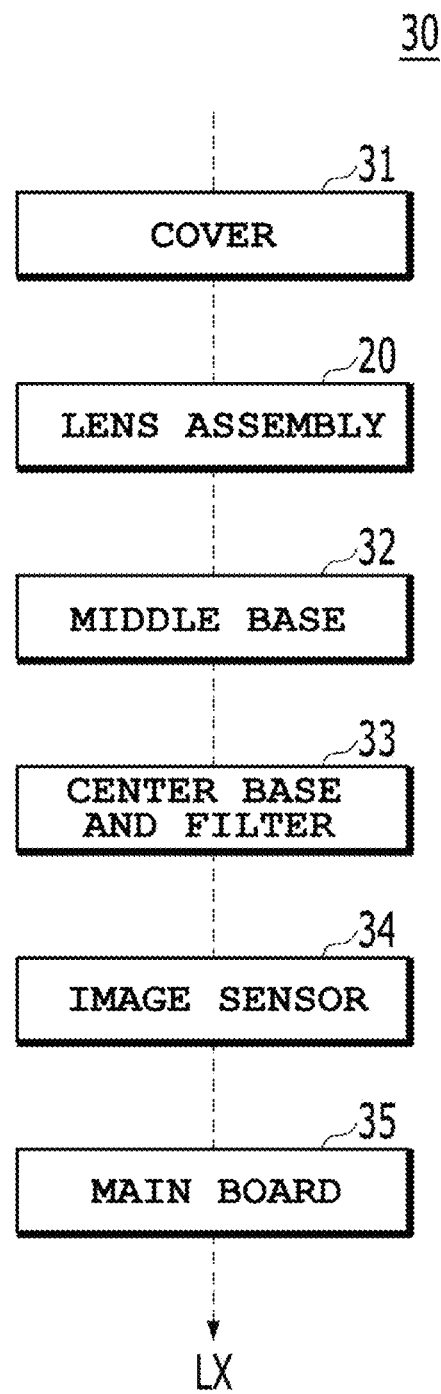
FIG. 9 is an exploded diagram of a camera module including the liquid lens module according to the first embodiment.

FIG. 9 is an exploded diagram of a camera module 30 including the liquid lens module 40 according to the first embodiment.

The camera module 30 shown in FIG. 9 may include a lens assembly 20, an image sensor 34, and a main board 35. Here, since the lens assembly 20 corresponds to the lens assembly shown in FIG. 8, the same reference numeral is used, and a duplicate description thereof is omitted.

The image sensor 34 may be disposed between the main board 35 and the lens assembly 20, and may perform a function of converting the light that has passed through the first lens unit 22, the liquid lens module 23 and the second lens unit 24 of the lens assembly 20 into image data. More specifically, the image sensor 34 may generate image data by converting light into analog signals via a pixel array including a plurality of pixels and synthesizing digital signals corresponding to the analog signals.

The main board 35 may be disposed below the lens assembly 20, and may include a recess in which the image sensor 34 may be mounted, seated, tightly disposed, fixed, provisionally fixed, supported, coupled, or accommodated, a circuit element (not shown), a connection part such as an FPCB (not shown), and a connector (not shown). The main board 35 serves to apply a driving voltage to the individual electrodes and the common electrode of the liquid lens through the first and second connection substrates 41 and 44.

The circuit element of the main board 35 may constitute a control module, which controls the liquid lens module 23 and the image sensor 34. The main board 35 may include a holder area in which the holder 21 is disposed and an element area in which a plurality of circuit elements is disposed.

The camera module 30 may further include a middle base 32. The middle base 32 may be disposed so as to surround the lower portion of the holder 21 shown in FIG. 8. The middle base 32 may be a member that is provided so as to be gripped by a gripper when active alignment is performed in the camera module 30 shown in FIG. 9, and may be omitted.

The middle base 32 may be mounted on the main board 35 so as to be spaced apart from the circuit element (not shown) disposed on the main board 35.

The camera module 30 may further include a sensor base and a filter 33. The filter may filter light within a specific wavelength range, among the light that has passed through the first lens unit 22, the liquid lens module 23, and the second lens unit 24. The filter may be an infrared (IR) light blocking filter or an ultraviolet (UV) light blocking filter, but the embodiments are not limited thereto. The filter may be disposed above the image sensor 34. The filter may be disposed inside the sensor base. For example, the filter may be disposed or mounted in a groove or a stepped portion formed inside the sensor base.

The sensor base may be disposed below the middle base 32, and may be attached to the main board 35. The sensor base may surround the image sensor 34, and may protect the image sensor 34 from foreign substances or external impacts.

The camera module 30 may further include a cover 31. The cover 31 may be disposed so as to surround the holder 21, the liquid lens module 23, and the middle base 32, and may protect these components 21, 23 and 32 from external impacts. The cover 31 may protect a plurality of lenses, which form the optical system, from external impacts.

Figure 10:
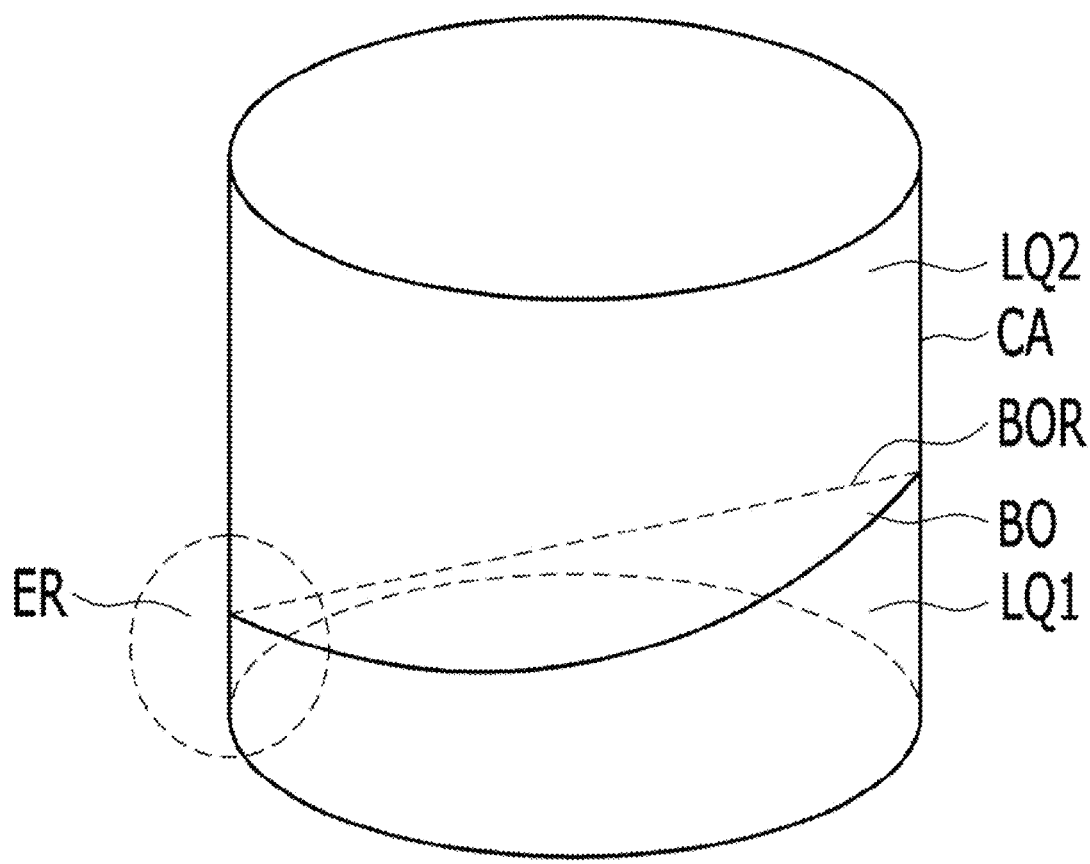
FIG. 10 is a view for explaining an OIS contact angle error.

FIG. 10 is a view for explaining an OIS contact angle error. Here, it is assumed that CA, LQ1, and LQ2 have functions respectively corresponding to those of the cavity, the liquid LQ1, and the liquid LQ2 shown in FIG. 1.

Figure 11:
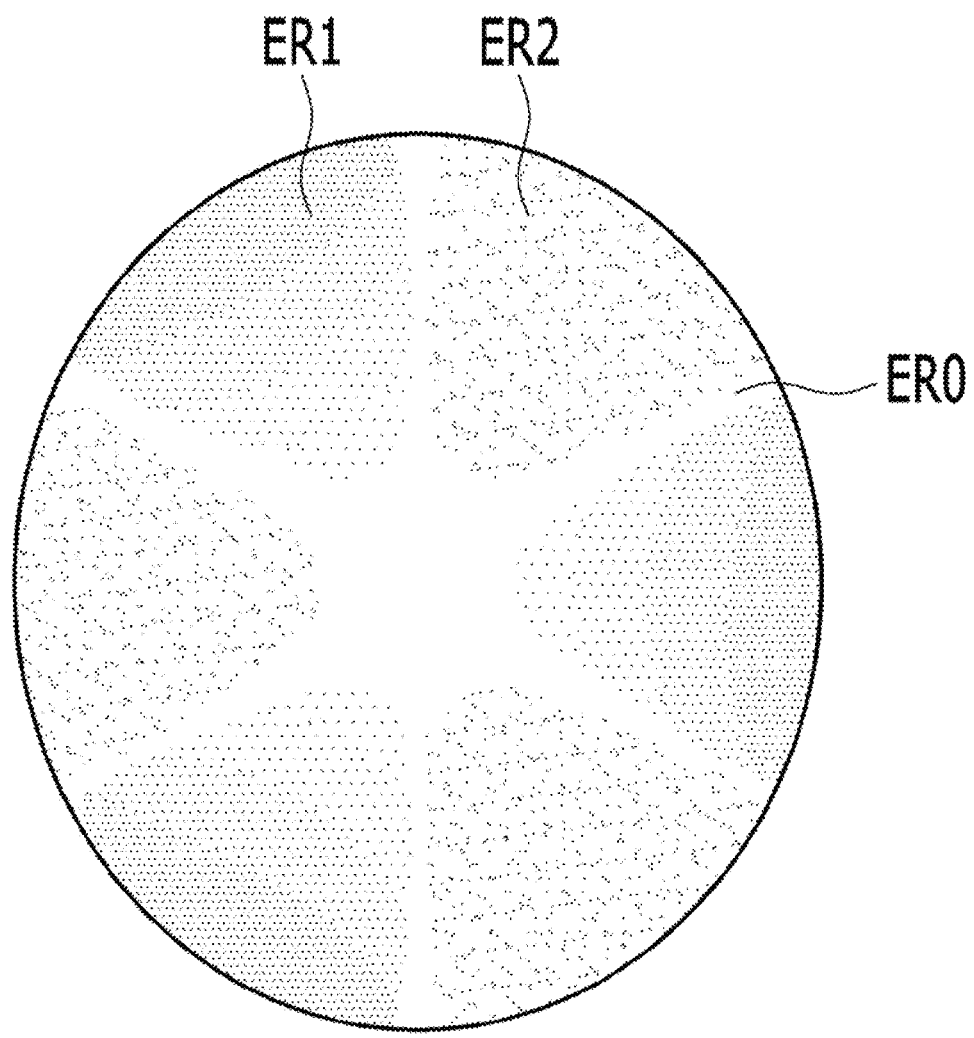
FIG. 11 shows a wavefront error, which occurs in a liquid lens module including a cavity having the three-dimensional shape shown in FIG. 10 when an OIS function is performed.

FIG. 11 shows a wavefront error (WFE), which occurs in the liquid lens module including a cavity having the three-dimensional shape shown in FIG. 10 when an OIS function is performed. Here, ER1 and ER2 represent portions in which the WFE is present, and ER0 represents a portion in which the WFE is not present.

In the camera module that performs an OIS function, it is assumed that the cavity in the liquid lens module has the three-dimensional shape of a cylinder, as shown in FIG. 10 (or a truncated cone, unlike the illustration of FIG. 10). In this case, when a driving voltage is applied in order to tilt the interface BO, the normal vector of the interface BO is defined as one vector in the Cartesian coordinate system, whereas the normal vector of the interface BO is defined as one vector in the polar coordinate system. Because the coordinate systems of these two vectors are different from each other, the angle between the two vectors changes for respective positions. Because the angle between the two vectors changes for respective positions, it is necessary to apply force in order to continuously change the contact angle of the interface BO. However, because the number of individual electrodes used to apply force is finite, a contact angle error ER inevitably occurs. That is, the interface BO of the two different types of liquids LQ1 and LQ2 has a gradient, rather than being accurately tilted BOR, with a result that a contact angle error ER occurs, as shown in FIG. 10. This error leads to the WFE (ER1 and ER2), as shown in FIG. 11, so an OIS function is not capable of being properly performed.

In contrast, according to the embodiment, in a camera module that performs an OIS function, when the cavity in the liquid lens module has the three-dimensional shape of a polygonal prism or a truncated polygonal pyramid, the OIS function is capable of being properly performed without a contact angle error, i.e. a WFE.

Also, in general, in the case of a liquid lens, the curvature of the interface BO is changed for AF, and the angle at which the interface BO is tilted is changed for OIS. However, in a liquid lens of a camera module that performs both an OIS function and an AF function, when a cavity has only one three-dimensional shape, one of a contact angle error for AF and a contact angle error for OIS inevitably occurs. That is, when the cavity in the liquid lens module has only one three-dimensional shape of, for example, a polygonal prism or a truncated polygonal pyramid, no contact angle error occurs when an OIS function is performed, thus realizing a proper OIS function, but a contact angle error inevitably occurs when an AF function is performed. On the other hand, in a camera module that performs both an OIS function and an AF function, when the cavity in the liquid lens module has only one three-dimensional shape of, for example, a cylinder or a truncated cone, no contact angle error occurs when an AF function is performed, thus realizing a proper AF function, but a contact angle error inevitably occurs when an OIS function is performed.

In contrast, in the case of the liquid lens module according to the embodiment, two cavities are disposed so as to vertically overlap each other on the optical axis, one of the two cavities being formed to have a three-dimensional shape suitable for performing an AF function, and the other one of the two cavities being formed to have a three-dimensional shape suitable for performing an OIS function. That is, two different types of liquids are charged, accommodated, or disposed in a cavity having the three-dimensional shape of a polygonal prism or a truncated polygonal pyramid, whereby an OIS function is capable of being properly performed without a contact angle error, and two different types of liquids are charged, accommodated, or disposed in a cavity having the three-dimensional shape of a cylinder or a truncated cone, whereby an AF function is capable of being properly performed without a contact angle error. As a result, the camera module including the liquid lens module according to the embodiment is capable of appropriately performing both an AF function and an OIS function without a WFE.

Second Embodiment

Hereinafter, a liquid lens module 100 according to a second embodiment and an optical device 200 will be described with reference to FIGS. 12 to 22.

Although the liquid lens module 100 according to the second embodiment and the optical device 200 will be described using the Cartesian coordinate system, the second embodiment is not limited thereto. That is, according to the Cartesian coordinate system, the x-axis, the y-axis, and the z-axis are perpendicular to each other, and the x'-axis, the y'-axis, and the z'-axis are perpendicular to each other, but the second embodiment is not limited thereto. That is, the x-axis, the y-axis, and the z-axis may intersect each other obliquely, rather than being perpendicular to each other, and the x'-axis, the y'-axis, and the z'-axis may intersect each other obliquely, rather than being perpendicular to each other.

Figure 12:
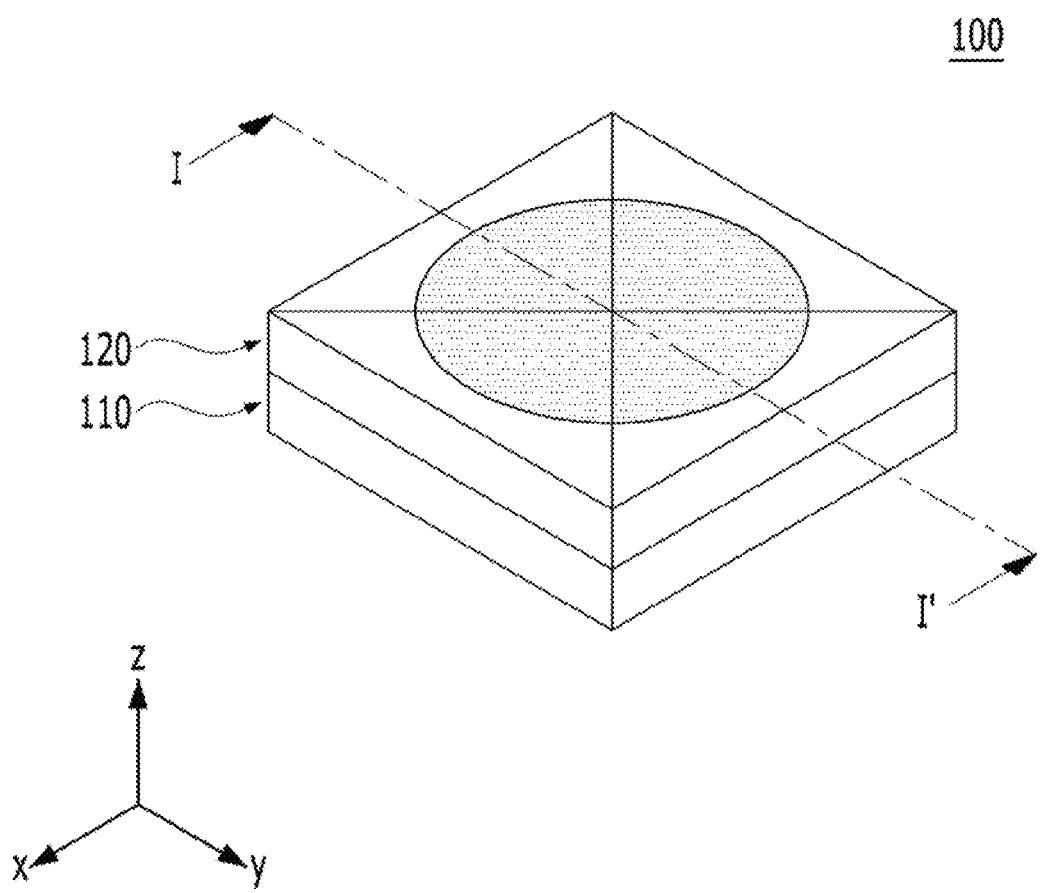
FIG. 12 is a perspective view of a liquid lens module according to a second embodiment.
Figure 13A:
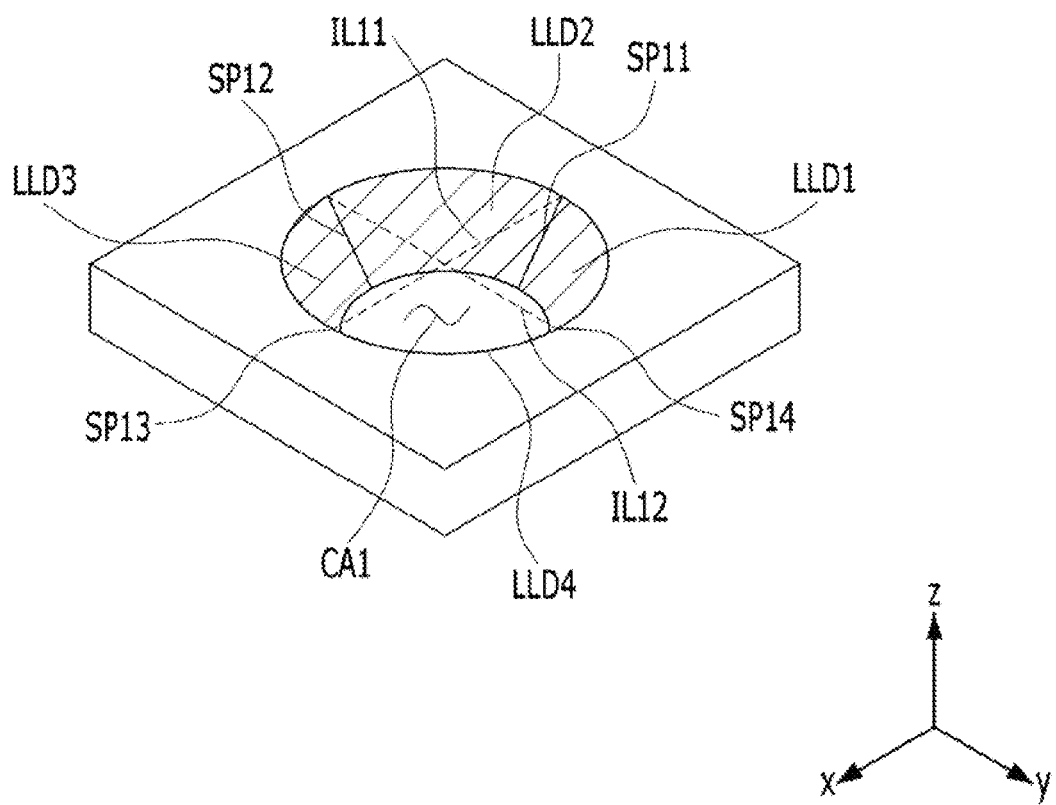
FIGS. 13A and 13B are, respectively, a perspective view and a bottom view of the first liquid lens shown in FIG. 12.
Figure 13B:
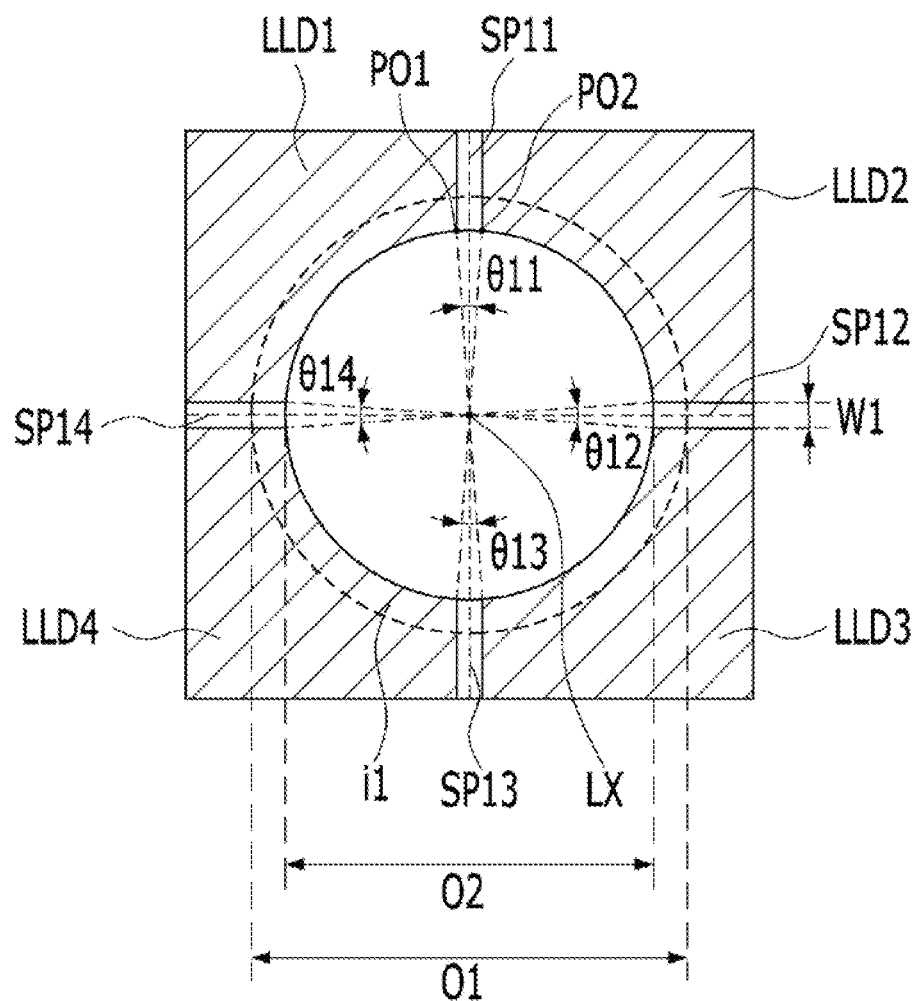
Figure 13B:
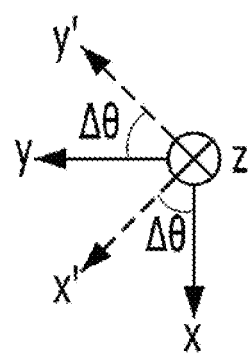
Figure 14A:
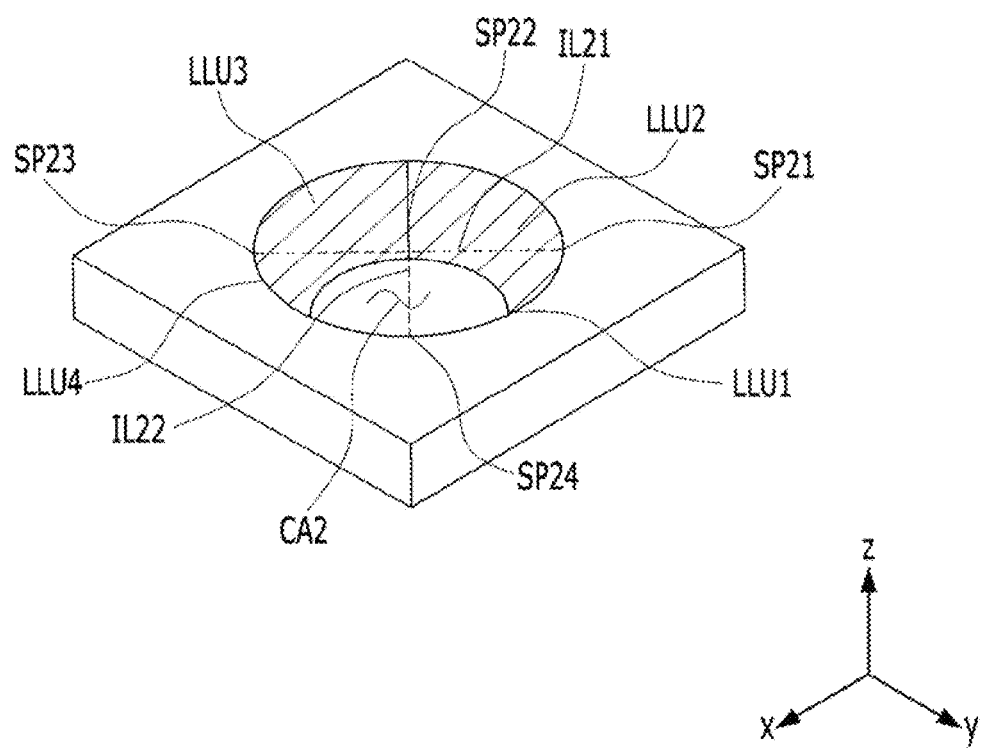
FIGS. 14A and 14B are, respectively, a perspective view and a bottom view of the second liquid lens shown in FIG. 12.
Figure 14B:
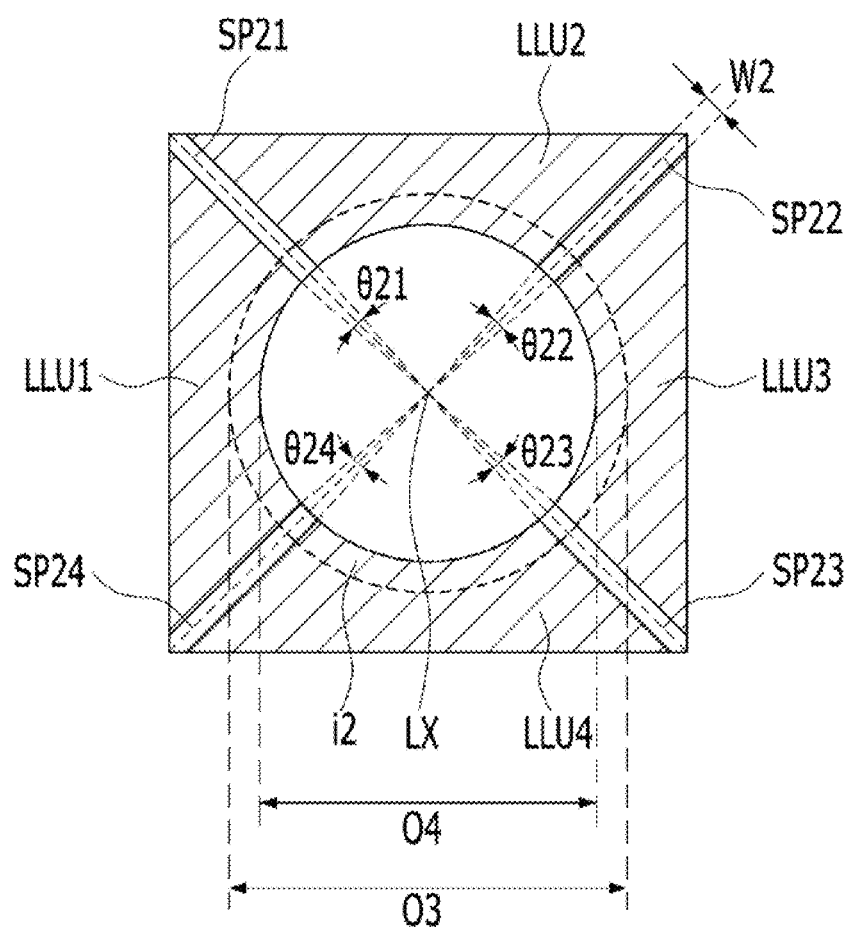
Figure 14B:
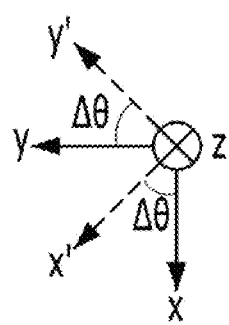
Figure 15:
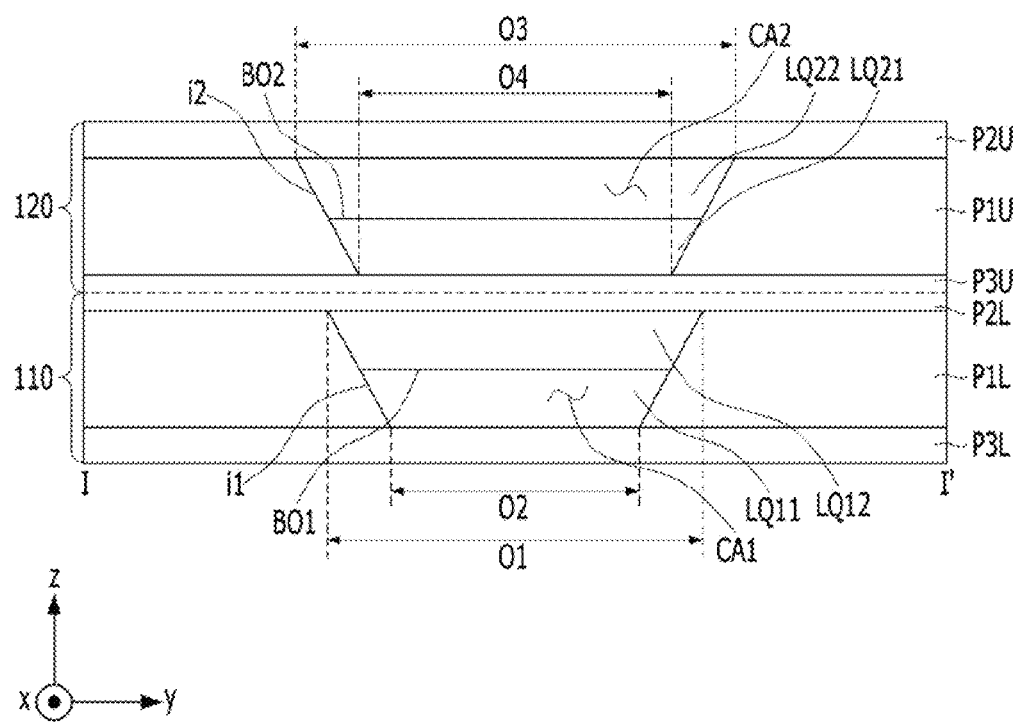
FIG. 15 is a cross-sectional view of the liquid lens module, taken along line I-I' in FIG. 12.

FIG. 12 is a perspective view of the liquid lens module 100 according to the second embodiment, FIGS. 13A and 13B are, respectively, a perspective view and a bottom view of the first liquid lens 110 shown in FIG. 12, FIGS. 14A and 14B are, respectively, a perspective view and a bottom view of the second liquid lens 120 shown in FIG. 12, and FIG. 15 is a cross-sectional view of the liquid lens module 100, taken along line I-I' in FIG. 12.

Referring to FIGS. 12 to 15, the liquid lens module 100 according to the second embodiment may include first and second liquid lenses 110 and 120. As illustrated, the second liquid lens 120 may be disposed on the first liquid lens 110, or, unlike the illustration, the first liquid lens 110 may be disposed on the second liquid lens 120.

Hereinafter, the liquid lens module 100 will be described as being configured such that the second liquid lens 120 is disposed on the first liquid lens 110, but the following description may also apply to the case in which the first liquid lens 110 is disposed on the second liquid lens 120.

The first liquid lens 110 according to the embodiment may include a plurality of different types of first liquids LQ11 and LQ12, first to third lower plates P1L, P2L and P3L, and a plurality of first individual electrodes. In addition, although not illustrated, the first liquid lens 110 may further include a first common electrode and a first insulation layer.

The plurality of first liquids LQ11 and LQ may be charged, accommodated, or disposed in a first cavity CA1, and may include a non-conductive liquid (or a non-conductive first liquid, hereinafter referred to as a "1-1st liquid") LQ11 and a conductive liquid (or a conductive first liquid, hereinafter referred to as a "1-2nd liquid") LQ12. The 1-1st liquid LQ11 and the 1-2nd liquid LQ12 may be immiscible with each other, and a first interface BO1 may be formed at a contact portion between the 1-1st and 1-2nd liquids LQ11 and LQ12. In an example, the 1-2nd liquid LQ12 may be disposed on the 1-1st liquid LQ11, but the embodiments are not limited thereto, and the positions of the liquids may be exchanged with each other.

According to an embodiment, the 1-1st liquid LQ11 may be disposed on the 1-2nd liquid LQ12.

The first lower plate P1L may include therein a first cavity CA1. A first inner side surface i1 of the first lower plate P1L may define a side portion of the first cavity CA1. In this case, the first inner side surface i1 of the first lower plate P1L may be inclined in the direction shown in FIG. 15, but the embodiments are not limited thereto, and the first inner side surface may be inclined in the opposite direction.

The first cavity CA1 may include first and second openings O1 and O2, which are respectively formed in upper and lower portions of the first lower plate P1L. For better understanding, the first opening O1, which is not visible, is indicated by the dotted line in the bottom view of FIG. 13B.

That is, the first cavity CA1 may be defined as an area surrounded by the first inner side surface i1 of the first lower plate P1L, the first opening O1, and the second opening O2. Accordingly, the first cavity CA1 may include the first opening O1 and the second opening O2. The diameter of the wider opening among the first and second openings O1 and O2 may be set in consideration of the field of view (FOV) required for the first liquid lens 110 or the role of the first liquid lens 110 in an optical device. According to the embodiment, the size (or the area or the width) of the first opening O1 may be greater than the size (or the area or the width) of the second opening O2. Here, the size of each of the first and second openings O1 and O2 may be the cross-sectional area in the horizontal direction (e.g. the x-axis direction and the y-axis direction). For example, the size of each of the first and second openings O1 and O2 may mean the radius when the opening has a circular cross-section, and may mean the diagonal length when the opening has a square cross-section.

The first cavity CA1 is a portion through which light passes. Thus, the first lower plate P1L defining the first cavity CA1 may be formed of a transparent material, or may include impurities so that light does not easily pass therethrough.

Light may enter the first cavity CA1 through the first opening O1, which is wider than the second opening O2, and may be emitted therefrom through the second opening O2. Alternatively, light may enter the first cavity CA1 through the second opening O2, which is narrower than the first opening O1, and may be emitted therefrom through the first opening O1.

In addition, the second lower plate P2L may be disposed on one of the upper side and the lower side of the first lower plate P1L, and the third lower plate P3L may be disposed on the other one of the upper side and the lower side of the first lower plate P1L. For example, as shown in FIG. 15, the second lower plate P2L may be disposed on the first lower plate P1L, and the third lower plate P3L may be disposed under the first lower plate P1L. In this case, the second lower plate P2L may be disposed on the first cavity CA1, and the third lower plate P3L may be disposed under the first cavity CA1.

The second lower plate P2L and the third lower plate P3L may be disposed so as to face each other, with the first lower plate P1L interposed therebetween. Alternatively, at least one of the second lower plate P2L or the third lower plate P3L may be omitted.

At least one of the second or third lower plates P2L or P3L may have a rectangular planar shape, and a portion thereof may be removed to expose a portion of an electrode, which will be described later. Each of the second and third lower plates P2L and P3L may be an area through which light passes, and may be formed of a light-transmissive material. For example, each of the second and third lower plates P2L and P3L may be formed of glass, and, for convenience of processing, may be formed of the same material. In addition, the edges of each of the second and third lower plates P2L and P3L may have a rectangular shape, without necessarily being limited thereto.

The second lower plate P2L may be configured to allow incident light to enter the first cavity CA1 in the first lower plate P1L. However, the optical path may be changed so as to be oriented in the opposite direction. The third lower plate P3L may be configured to allow the light that has passed through the first cavity CA1 in the first lower plate P1L to be emitted therefrom, or may be configured to allow the light to travel in the opposite direction. The second lower plate P2L may be in direct contact with the 1-2nd liquid LQ12.

In addition, the actual effective lens area of the first liquid lens 110 may be less than the diameter of the second opening O2, which is the narrower opening among the first and second openings O1 and O2 in the first lower plate P1L.

Meanwhile, the first common electrode (not shown) may be disposed on one surface of the first lower plate P1L (e.g. on the first lower plate P1L), and the plurality of first individual electrodes may be disposed on the opposite surface of the first lower plate P1L (e.g. under the first lower plate P1L).

Further, each of the plurality of first individual electrodes may be disposed so as to extend from a region between the first and third lower plates P1L and P3L to a portion of the first inner side surface i1 of the first lower plate P1L, or may be disposed on the entire area of the first inner side surface i1.

For convenience of description, FIGS. 13A and 13B show the case in which each of the plurality of first individual electrodes is disposed on the entire area of the first inner side surface i1 of the first lower plate P1L. In this case, the plurality of first individual electrodes may be sequentially disposed in the clockwise direction in the first cavity CA1.

Further, each of the plurality of first individual electrodes may extend from the first inner side surface i1 of the first lower plate P1L to the top of the first lower plate P1L so as to be spaced apart from the first common electrode.

A portion of the first common electrode that is disposed on the first lower plate P1L may be exposed to the conductive 1-2nd liquid LQ12, and thus may be in direct contact with the 1-2nd liquid LQ12. Alternatively, although not shown, the first insulation layer may be disposed between each of the plurality of first individual electrodes and the 1-1st and 1-2nd liquids LQ11 and LQ12, so each of the plurality of first individual electrodes and the 1-1st and 1-2nd liquids LQ11 and LQ12 may be electrically separated from each other.

The first common electrode may be one electrode, whereas the first individual electrodes may be a plurality of electrodes. For example, as illustrated, the number of first individual electrodes may be 4, or, unlike the illustration, the number may be 8, but the embodiments are not limited as to the specific number of first individual electrodes.

Hereinafter, the plurality of first individual electrodes will be described as including 1-1st to 1-4th individual electrodes LLD1 to LLD4, which are sequentially disposed in the clockwise direction (or in the counterclockwise direction) with respect to the optical axis LX. However, the following description may also apply to the case in which the plurality of first individual electrodes includes a plurality of individual electrodes (e.g. 8 individual electrodes), which are sequentially disposed in the clockwise direction (or in the counterclockwise direction) with respect to the optical axis LX.

The first common electrode and each of the first individual electrodes LLD1 to LLD4 may be formed of a conductive material, e.g. metal.

In addition, the first insulation layer may be disposed so as to completely cover all of the first individual electrodes LLD1 to LLD4 disposed on the first inner side surface i1 of the first cavity CA1. In addition, the first insulation layer may be disposed on the upper surface of the first lower plate P1L so as to cover a portion of the first common electrode and to completely cover all of the first individual electrodes LLD1 to LLD4. Accordingly, the first insulation layer may inhibit contact between the first individual electrodes LLD1 to LLD4 and the 1-1st liquid LQ11, contact between the first individual electrodes LLD1 to LLD4 and the 1-2nd liquid LQ12, and contact between the third lower plate P3L and the 1-1st liquid LQ11.

The first insulation layer may cover the first individual electrodes LLD1 to LLD4, and may expose a portion of the first common electrode so that electrical energy is applied to the conductive 1-2nd liquid LQ12 through the first common electrode.

Meanwhile, the second liquid lens 120 according to the embodiment may include a plurality of different types of second liquids LQ21 and LQ22, first to third upper plates P1U, P2U and P3U, and a plurality of second individual electrodes. In addition, although not illustrated, the second liquid lens 120 may further include a second common electrode and a second insulation layer.

The plurality of second liquids LQ21 and LQ22 may be charged, accommodated, or disposed in a second cavity CA2, and may include a non-conductive liquid (or a non-conductive second liquid, hereinafter referred to as a "2-1st liquid") LQ21 and a conductive liquid (or a conductive second liquid, hereinafter referred to as a "2-2nd liquid") LQ22. The 2-1st liquid LQ21 and the 2-2nd liquid LQ22 may be immiscible with each other, and a second interface 802 may be formed at a contact portion between the 2-1st and 2-2nd liquids LQ21 and LQ22. In an example, as illustrated, the 2-2nd liquid LQ22 may be disposed on the 2-1st liquid LQ21, but the embodiments are not limited thereto. According to another embodiment, unlike the illustration, the 2-1st liquid LQ21 may be disposed on the 2-2nd liquid LQ22.

The first upper plate P1U may include therein a second cavity CA2. A second inner side surface i2 of the first upper plate P1U may define a side portion of the second cavity CA2. In this case, the second inner side surface i2 of the first upper plate P1U may be inclined in the direction shown in FIG. 15, but the embodiments are not limited thereto, and the second inner side surface may be inclined in the opposite direction.

The second cavity CA2 may include third and fourth openings O3 and O4, which are respectively formed in lower and upper portions of the first upper plate P1U. For better understanding, the third opening O3, which is not visible, is indicated by the dotted line in the bottom view of FIG. 14B.

The second cavity CA2 may be defined as an area surrounded by the second inner side surface i1 of the first upper plate P1U, the third opening O3, and the fourth opening O4. The second cavity CA2 may be disposed at a position corresponding to the first cavity CA1, and may be disposed so as to overlap the first cavity CA1 in the direction of the optical axis LX (or parallel to the optical axis).

The diameter of the wider opening among the third and fourth openings O3 and O4 may be set in consideration of the field of view (FOV) required for the second liquid lens 120 or the role of the second liquid lens 120 in an optical device. According to the embodiment, the size (or the area or the width) of the third opening O3 may be greater than the size (or the area or the width) of the fourth opening O4. Here, the size of each of the third and fourth openings O3 and O4 may be the cross-sectional area in the horizontal direction (e.g. the x-axis direction and the y-axis direction). For example, the size of each of the third and fourth openings O3 and O4 may mean the radius when the opening has a circular cross-section, and may mean the diagonal length when the opening has a square cross-section. Each of the third and fourth openings O3 and O4 may have a circular cross-section.

The second cavity CA2 is a portion through which light passes. Thus, the first upper plate P1U defining the second cavity CA2 may be formed of a transparent material, or may include impurities so that light does not easily pass therethrough.

Light may enter the second cavity CA2 through the third opening O3, which is wider than the fourth opening O4, and may be emitted therefrom through the fourth opening O4. Alternatively, light may enter the second cavity CA2 through the fourth opening O4, which is narrower than the third opening O3, and may be emitted therefrom through the third opening O3.

Hereinafter, the embodiment will be described as being configured such that light is introduced through the third opening O3 and emitted through the fourth opening O4 and such that the light emitted from the fourth opening O4 is introduced through the first opening O1 and emitted through the second opening O2. However, the following description may also apply to the case in which light is introduced through the second opening O2 and emitted through the first opening O1 and the light emitted from the first opening O1 is introduced through the fourth opening O4 and emitted through the third opening O3.

In addition, the second upper plate P2U may be disposed on one of the upper side and the lower side of the first upper plate P1U, and the third upper plate P3U may be disposed on the other one of the upper side and the lower side of the first upper plate P1U. For example, as shown in FIG. 15, the second upper plate P2U may be disposed on the first upper plate P1U, and the third upper plate P3U may be disposed under the first upper plate P1U. In this case, the second upper plate P2U may be disposed on the second cavity CA2, and the third upper plate P3U may be disposed under the second cavity CA2.

According to the embodiment, one of the second and third lower plates P2L and P3L and one of the second and third upper plates P2U and P3U may face each other, and may be integrated with each other. For example, referring to FIG. 15, the second lower plate P2L and the third upper plate P3U may face each other, and may be integrated with each other. When the second lower plate P2L and the third upper plate P3U are integrated, the overall size of the liquid lens module 100 may be reduced compared to the case in which the second lower plate P2L and the third upper plate P3U are spaced apart from each other, rather than being integrated.

The second upper plate P2U and the third upper plate P3U may be disposed so as to face each other, with the first upper plate P1U interposed therebetween. Alternatively, at least one of the second upper plate P2U or the third lower plate P3U may be omitted.

At least one of the second or third upper plates P2U or P3U may have a rectangular planar shape, and a portion thereof may be removed to expose a portion of an electrode, which will be described later. Each of the second and third upper plates P2U and P3U may be an area through which light passes, and may be formed of a light-transmissive material. For example, each of the second and third upper plates P2U and P3U may be formed of glass, and, for convenience of processing, may be formed of the same material. In addition, the edges of each of the second and third upper plates P2U and P3U may have a rectangular shape, without necessarily being limited thereto.

The second upper plate P2U may be configured to allow incident light to enter the second cavity CA2 in the first upper plate P1U. The third upper plate P3U may be configured to allow the light that has passed through the second cavity CA2 in the first upper plate P1U to be emitted therefrom.

In addition, the actual effective lens area of the second liquid lens 120 may be less than the diameter of the fourth opening O4, which is the narrower opening among the third and fourth openings O3 and O4 in the first upper plate P1L.

Meanwhile, the second common electrode (not shown) may be disposed on one surface of the first upper plate P1U (e.g. on the first upper plate P1U), and the plurality of second individual electrodes may be disposed on the opposite surface of the first upper plate P1U (e.g. under the first upper plate P1U).

Further, each of the plurality of second individual electrodes may be disposed so as to extend from a region between the first and third upper plates P1U and P3U to a portion of the second inner side surface i2 of the first upper plate P1U, or may be disposed on the entire area of the second inner side surface i2. For convenience of description, FIGS. 14A and 14B show the case in which each of the plurality of second individual electrodes is disposed on the entire area of the second inner side surface i2 of the first upper plate P1U. In this case, the plurality of second individual electrodes may be sequentially disposed in the clockwise direction (or in the counterclockwise direction) in the second cavity CA2.

Further, each of the plurality of second individual electrodes may extend from the second inner side surface i2 of the first upper plate P1U to the top of the first upper plate P1U so as to be spaced apart from the second common electrode.

A portion of the second common electrode that is disposed on the first upper plate P1U may be exposed to the conductive 2-2nd liquid LQ22, and thus may be in direct contact with the 2-2nd liquid LQ22. Alternatively, although not shown, the second insulation layer may be disposed between each of the plurality of second individual electrodes and the 2-1st and 2-2nd liquids LQ21 and LQ22, so each of the plurality of second individual electrodes and the 2-1st and 2-2nd liquids LQ21 and LQ22 may be electrically separated from each other.

The second common electrode may be one electrode, whereas the second individual electrodes may be a plurality of electrodes. For example, as illustrated, the number of second individual electrodes may be 4, or, unlike the illustration, the number may be greater (e.g. 8), but the embodiments are not limited as to the specific number of second individual electrodes.

Hereinafter, the plurality of second individual electrodes will be described as including 2-1st to 2-4th individual electrodes LLU1 to LLU4, which are sequentially disposed in the clockwise direction (or in the counterclockwise direction) with respect to the optical axis LX. However, the following description may also apply to the case in which the plurality of second individual electrodes includes 8 individual electrodes, which are sequentially disposed in the clockwise direction (or in the counterclockwise direction) with respect to the optical axis LX.

The second common electrode and each of the second individual electrodes LLU1 to LLU4 may be formed of a conductive material.

In addition, the second insulation layer may be disposed so as to completely cover all of the second individual electrodes LLU1 to LLU4 disposed on the second inner side surface i2 of the second cavity CA2. In addition, the second insulation layer may be disposed on the upper surface of the first upper plate P1U so as to cover a portion of the second common electrode and to completely cover all of the second individual electrodes LLU1 to LLU4. Accordingly, the second insulation layer may inhibit contact between the second individual electrodes LLU1 to LLU4 and the 2-1st liquid LQ21, contact between the second individual electrodes LLU1 to LLU4 and the 2-2nd liquid LQ22, and contact between the third upper plate P3U and the 2-1st liquid LQ21.

The second insulation layer may cover the second individual electrodes LLU1 to LLU4, and may expose a portion of the second common electrode so that electrical energy is applied to the conductive 2-2nd liquid LQ22 through the second common electrode.

Each of the first and second liquid lenses 110 and 120 may perform a hand-tremor compensation or optical image stabilization (OIS) function or an auto-focusing (AF) function.

When a liquid lens performs an AF function and when a liquid lens performs an OIS function, a wavefront error (WFE) may occur. The wavefront error (WFE) may degrade the quality of an image. In particular, when an OIS function is performed, the wavefront error (WFE) may greatly increase, thereby degrading the quality of an image.

Hereinafter, the configuration of the liquid lens module 100 according to the embodiment for removing or reducing a wavefront error will be described in detail.

Referring to FIGS. 13A and 13B, the plurality of first individual electrodes LLD1 to LLD4 may be spaced apart from each other, with boundary portions (or cutoff portions) (hereinafter referred to as "first boundary portions") SP11 to SP14 interposed therebetween.

For example, the 1-1st individual electrode LLD1 and the 1-2nd individual electrode LLD2 may be disposed so as to be electrically separated from each other, with the first boundary portion (hereinafter referred to as a "1-1st boundary portion") SP11 interposed therebetween. The 1-2nd individual electrode LLD2 and the 1-3rd individual electrode LLD3 may be disposed so as to be electrically separated from each other, with the first boundary portion (hereinafter referred to as a "1-2nd boundary portion") SP12 interposed therebetween. The 1-3rd individual electrode LLD3 and the 1-4th individual electrode LLD4 may be disposed so as to be electrically separated from each other, with the first boundary portion (hereinafter referred to as a "1-3rd boundary portion") SP13 interposed therebetween. The 1-4th individual electrode LLD4 and the 1-1st individual electrode LLD1 may be disposed so as to be electrically separated from each other, with the first boundary portion (hereinafter referred to as a "1-4th boundary portion") SP14 interposed therebetween. To this end, the first insulation layer may be disposed in each of the 1-1st to 1-4th boundary portions SP11 to SP14. As described above, the first boundary portions may include a plurality of boundary portions SP11 to SP14.

The plurality of first individual electrodes LLD1 to LLD4 may have a planar shape in which they are spaced the same angular distance (hereinafter referred to as a "first angular distance") apart from each other with respect to the optical axis LX. Here, the angular distance may be an angle between two straight lines that extend from one point to two other respective points. For example, as shown in FIG. 13B, in the case in which each of the plurality of first individual electrodes LLD1 to LLD4 is disposed on the first inner side surface i1 of the first lower plate P1L, when a point in the 1-1st individual electrode LLD1 at which the 1-1st boundary portion SP11 and the second opening O2 are in contact with each other is denoted by "P01" and when a point in the 1-2nd individual electrode LLD2 at which the 1-1st boundary portion SP11 and the second opening O2 are in contact with each other is denoted by "P02", the angle between two straight lines that respectively extend from the center of the first cavity CA1, through which the optical axis LX passes, to the two points P01 and P02 is "θ11". In this case, the first angular distance (hereinafter referred to as a "1-1st angular distance") that the 1-1st and 1-2nd individual electrodes LLD1 and LLD2 are spaced apart from each other with respect to the optical axis LX may be θ11. In addition, the first angular distance (hereinafter referred to as a "1-2nd angular distance") that the 1-2nd and 1-3rd individual electrodes LLD2 and LLD3 are spaced apart from each other with respect to the optical axis LX may be θ12. In addition, the first angular distance (hereinafter referred to as a "1-3rd angular distance") that the 1-3rd and 1-4th individual electrodes LLD3 and LLD4 are spaced apart from each other with respect to the optical axis LX may be θ13. In addition, the first angular distance (hereinafter referred to as a "1-4th angular distance") that the 1-4th and 1-1st individual electrodes LLD4 and LLD1 are spaced apart from each other with respect to the optical axis LX may be θ14.

According to the embodiment, the plurality of first angular distances, i.e. the 1-1st to 1-4th angular distances θ11, θ12, θ13 and θ14, may be the same as each other. In addition, the plurality of first individual electrodes LLD1 to LLD4 may have the same area (areas of the lower surfaces thereof).

In addition, according to an embodiment, the first boundary portions may be disposed in directions corresponding to the edges of the first liquid lens 110, and second boundary portions may be disposed in directions corresponding to the corners of the second liquid lens 120. For example, as illustrated, in a bottom plan view, each of the 1-1st to 1-4th boundary portions SP11 to SP14 may be contiguous with a respective one of the edges of the first liquid lens 110, and each of the 2-1st to 2-4th boundary portions SP21 to SP24 may be contiguous with a respective one of the corners of the second liquid lens 120.

Alternatively, according to another embodiment, the first boundary portions may be disposed in the directions corresponding to the corners of the first liquid lens 110, and the second boundary portions may be disposed in the directions corresponding to the edges of the second liquid lens 120. For example, unlike the illustration, in a bottom plan view, each of the 1-1st to 1-4th boundary portions SP11 to SP14 may be contiguous with a respective one of the corners of the first liquid lens 110, and each of the 2-1st to 2-4th boundary portions SP21 to SP24 may be contiguous with a respective one of the edges of the second liquid lens 120.

In addition, according to the embodiment, the plurality of 1-1st to 1-4th boundary portions SP11 to SP14 may face each other in the first direction with respect to the center of the first cavity CA1, through which the optical axis LX passes. That is, the 1-1st and 1-3rd boundary portions SP11 and SP13 may face each other in the first direction (hereinafter referred to as a "1-1st direction") with respect to the center LX of the first cavity CA1, and the 1-2nd and 1-4th boundary portions SP12 and SP14 may face each other in the first direction (hereinafter referred to as a "1-2nd direction") with respect to the center LX of the first cavity CA1. Here, the 1-1st direction may be the x-axis direction, and the 1-2nd direction may be the y-axis direction.

Referring to FIGS. 14A and 14B, the plurality of second individual electrodes LLU1 to LLU4 may be spaced apart from each other, with boundary portions (hereinafter referred to as "second boundary portions") SP21 to SP24 interposed therebetween. That is, the 2-1st individual electrode LLU1 and the 2-2nd individual electrode LLU2 may be disposed so as to be electrically separated from each other, with the second boundary portion (hereinafter referred to as a "2-1st boundary portion") SP21 interposed therebetween. The 2-2nd individual electrode LLU2 and the 2-3rd individual electrode LLU3 may be disposed so as to be electrically separated from each other, with the second boundary portion (hereinafter referred to as a "2-2nd boundary portion") SP22 interposed therebetween. The 2-3rd individual electrode LLU3 and the 2-4th individual electrode LLU4 may be disposed so as to be electrically separated from each other, with the second boundary portion (hereinafter referred to as a "2-3rd boundary portion") SP23 interposed therebetween. The 2-4th individual electrode LLU4 and the 2-1st individual electrode LLU1 may be disposed so as to be electrically separated from each other, with the second boundary portion (hereinafter referred to as a "2-4th boundary portion") SP24 interposed therebetween. To this end, the second insulation layer may be disposed in each of the 2-1st to 2-4th boundary portions SP21 to SP24. As described above, the second boundary portions may include a plurality of boundary portions SP21 to SP24.

The plurality of second individual electrodes LLU1 to LLU4 may have a planar shape in which they are spaced the same angular distance (hereinafter referred to as a "second angular distance") apart from each other with respect to the optical axis LX. In this case, the second angular distance (hereinafter referred to as a "2-1st angular distance") that the 2-1st and 2-2nd individual electrodes LLU1 and LLU2 are spaced apart from each other with respect to the optical axis LX may be θ21. In addition, the second angular distance (hereinafter referred to as a "2-2nd angular distance") that the 2-2nd and 2-3rd individual electrodes LLU2 and LLU3 are spaced apart from each other with respect to the optical axis LX may be θ22. In addition, the second angular distance (hereinafter referred to as a "2-3rd angular distance") that the 2-3rd and 2-4th individual electrodes LLU3 and LLU4 are spaced apart from each other with respect to the optical axis LX may be θ23. In addition, the second angular distance (hereinafter referred to as a "2-4th angular distance") that the 2-4th and 2-1st individual electrodes LLU4 and LLU1 are spaced apart from each other with respect to the optical axis LX may be θ24.

According to the embodiment, the plurality of second angular distances, i.e. the 2-1st to 2-4th angular distances θ21, θ22, θ23 and θ24, may be the same as each other. In addition, the plurality of second individual electrodes LLU1 to LLU4 may have the same area (areas of the lower surfaces thereof).

In addition, according to the embodiment, the plurality of second boundary portions SP21 to SP24 may face each other in the second direction with respect to the center of the second cavity CA2, through which the optical axis LX passes. That is, the 2-1st and 2-3rd boundary portions SP21 and SP23 may face each other in the second direction (hereinafter referred to as a "2-1st direction") with respect to the center LX of the second cavity CA2, and the 2-2nd and 2-4th boundary portions SP22 and SP24 may face each other in the second direction (hereinafter referred to as a "2-2nd direction") with respect to the center LX of the second cavity CA2. Here, the 2-1st direction may be the y'-axis direction, and the 2-2nd direction may be the x'-axis direction.

The first direction and the second direction described above may be different directions from each other. When the number of first individual electrodes is M and when the number of second individual electrodes is N, the minimum angle between the first direction and the second direction may be equal to or less than Δθ, which is expressed using Equation 4 below.

$$\Delta\theta = \frac{360°}{(M+N)} \quad \text{[Equation 4]}$$

Referring to FIG. 13A, first imaginary lines are defined as imaginary lines that extend from the optical axis LX, which passes through the center of the first cavity CA1 and the center of the second cavity CA2, to the first boundary portions SP11 to SP14. For example, the first imaginary lines may include a 1-1st imaginary line IL11 and a 1-2nd imaginary line IL12. The 1-1st imaginary line IL11 is an imaginary straight line that extends from the optical axis LX to the 1-1st boundary portion SP11 and the 1-3rd boundary portion SP13, and the 1-2nd imaginary line IL12 is an imaginary straight line that extends from the optical axis LX to the 1-2nd boundary portion SP12 and the 1-4th boundary portion SP14.

In addition, referring to FIG. 14A, second imaginary lines are defined as imaginary lines that extend from the optical axis LX, which passes through the center of the first cavity CA1 and the center of the second cavity CA2, to the second boundary portions SP21 to SP24. For example, the second imaginary lines may include a 2-1st imaginary line IL21 and a 2-2nd imaginary line IL22. The 2-1st imaginary line IL21 is an imaginary straight line that extends from the optical axis LX to the 2-1st boundary portion SP21 and the 2-3rd boundary portion SP23, and the 2-2nd imaginary line IL22 is an imaginary straight line that extends from the optical axis LX to the 2-2nd boundary portion SP22 and the 2-4th boundary portion SP24.

According to the embodiment, in a plan view, the minimum angle between the first imaginary lines and the second imaginary lines may be equal to or less than Δθ, which is expressed using Equation 4 above.

For example, as illustrated, when M=N=4, Δθ may be 45°. That is, the minimum angle between the x-axis direction, which is the 1-1st direction, and the x'-axis direction, which is the 2-2nd direction, may be equal to or less than 45°, and the minimum angle between the y-axis direction, which is the 1-2nd direction, and the y'-axis direction, which is the 2-1st direction, may be equal to or less than 45°. That is, in a plan view, the minimum angle between the first imaginary lines and the second imaginary lines may be equal to or less than 45°.

Alternatively, unlike the illustration, when M=N=8, the minimum angle between the first direction and the second direction may be equal to or less than 22.5°. That is, in a plan view, the minimum angle between the first imaginary lines and the second imaginary lines may be equal to or less than 22.5°.

As described above, the first and second liquid lenses 110 and 120 may have the same configuration, except that the direction in which the first boundary portions, which electrically insulate the plurality of first individual electrodes, face each other with respect to the optical axis LX and the direction in which the second boundary portions, which electrically insulate the plurality of second individual electrodes, face each other with respect to the optical axis LX are different. Accordingly, according to the embodiment, the first boundary portions and the second boundary portions may be disposed so as not to overlap each other in a direction parallel to the optical axis LX (e.g. in the z-axis direction).

That is, the first angular distances θ11, θ12, θ13 and θ14 and the second angular distances θ21, θ22, θ23 and θ24 may be the same. Also, the first opening O1, which is the larger opening among the first and second openings O1 and O2, and the third opening O3, which is the larger opening among the third and fourth openings O3 and O4, may be the same size. Also, the second opening O2, which is the smaller opening among the first and second openings θ1 and θ2, and the fourth opening O4, which is the smaller opening among the third and fourth openings O3 and O4, may be the same size. In this case, the plurality of first individual electrodes LLD1 to LLD4 and the second boundary portions SP21 to SP24 may overlap each other in the direction of the optical axis LX (or parallel to the optical axis) (e.g. in the z-axis direction). In addition, the plurality of second individual electrodes LLU1 to LLU4 and the first boundary portions SP11 to SP14 may overlap each other in the direction of the optical axis LX (or parallel to the optical axis). This will now be described in detail.

In an example, the 1-1st individual electrode LLD1 and the 2-1st boundary portion SP21 may overlap each other in the z-axis direction, the 1-2nd individual electrode LLD2 and the 2-2nd boundary portion SP22 may overlap each other in the z-axis direction, the 1-3rd individual electrode LLD3 and the 2-3rd boundary portion SP23 may overlap each other in the z-axis direction, and the 1-4th individual electrode LLD4 and the 2-4th boundary portion SP24 may overlap each other in the z-axis direction.

In addition, the 2-1st individual electrode LLU1 and the 1-4th boundary portion SP14 may overlap each other in the z-axis direction, the 2-2nd individual electrode LLU2 and the 1-1st boundary portion SP11 may overlap each other in the z-axis direction, the 2-3rd individual electrode LLU3 and the 1-2nd boundary portion SP12 may overlap each other in the z-axis direction, and the 2-4th individual electrode LLU4 and the 1-3rd boundary portion SP13 may overlap each other in the z-axis direction.

In addition, an imaginary horizontal plane formed by extending each of the first boundary portions in the z-axis direction may bisect a respective one of the second individual electrodes. Also, an imaginary horizontal plane formed by extending each of the second boundary portions in the z-axis direction may bisect a respective one of the first individual electrodes.

Meanwhile, although not illustrated, the liquid lens module 100 according to the embodiment may further include a first lower connection substrate, a second lower connection substrate, a first upper connection substrate, and a second upper connection substrate.

The first lower connection substrate may be electrically connected to an electrode pad, which is formed on a main board (not shown), via a connection pad, which is electrically connected to the first common electrode. The second lower connection substrate may be electrically connected to an electrode pad, which is formed on the main board, via connection pads, which are respectively electrically connected to the plurality of first individual electrodes LLD1 to LLD4.

In addition, the first upper connection substrate may be electrically connected to an electrode pad, which is formed on the main board, via a connection pad, which is electrically connected to the second common electrode. The second upper connection substrate may be electrically connected to an electrode pad, which is formed on the main board, via connection pads, which are electrically connected to the second individual electrodes LLU1 to LLU4.

For example, each of the first lower connection substrate and the first upper connection substrate may be implemented as an FPCB or a single metal substrate (a conductive metal plate), and each of the second lower connection substrate and the second upper connection substrate may be implemented as a flexible printed circuit board (FPCB). However, the embodiments are not limited thereto.

The first lower connection substrate may transmit one driving voltage (hereinafter referred to as a "common voltage") to the first common electrode, and the second lower connection substrate may respectively transmit "M" different voltages (hereinafter referred to as "individual voltages") to the plurality of first individual electrodes LLD1 to LLD4. The common voltage may include a DC voltage or an AC voltage, and when the common voltage is applied in a pulse form, the width of the pulse or the duty cycle thereof may be uniform. That is, a driving voltage may be supplied to the first liquid lens 110 through the first lower connection substrate and the second lower connection substrate.

The first upper connection substrate may transmit one common voltage to the second common electrode, and the second upper connection substrate may transmit "N" different voltages to the plurality of second individual electrodes LLU1 to LLU4. That is, a driving voltage may be supplied to the second liquid lens 120 through the first upper connection substrate and the second upper connection substrate.

In response to the driving voltage, the curvature of the first interface BO1 formed in the first liquid lens 110 changes, and the curvature of the second interface BO2 formed in the second liquid lens 120 changes, whereby the liquid lens module 100 is capable of performing an AF function.

Alternatively, in response to the driving voltage, the angle at which the first interface BO1 formed in the first liquid lens 110 is tilted changes, and the angle at which the second interface BO2 formed in the second liquid lens 120 is tilted changes, whereby the liquid lens module 100 is capable of performing an OIS function.

Figure 16A:
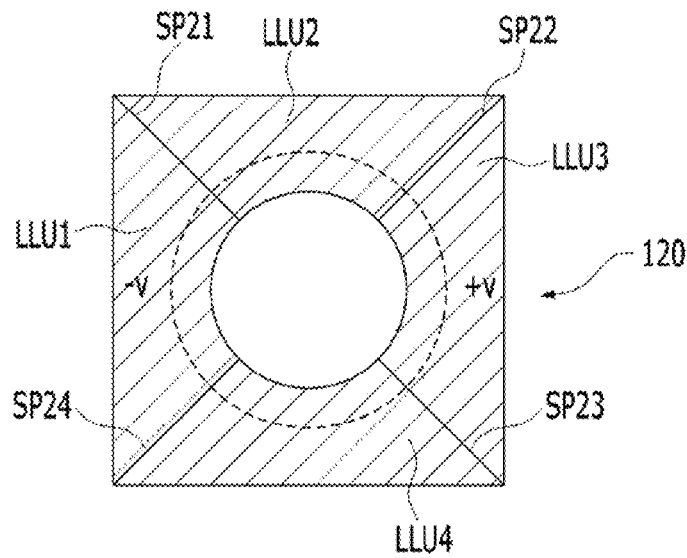
FIGS. 16A to 16C are bottom views for explaining the operation of the liquid lens module according to the second embodiment.
Figure 16A:
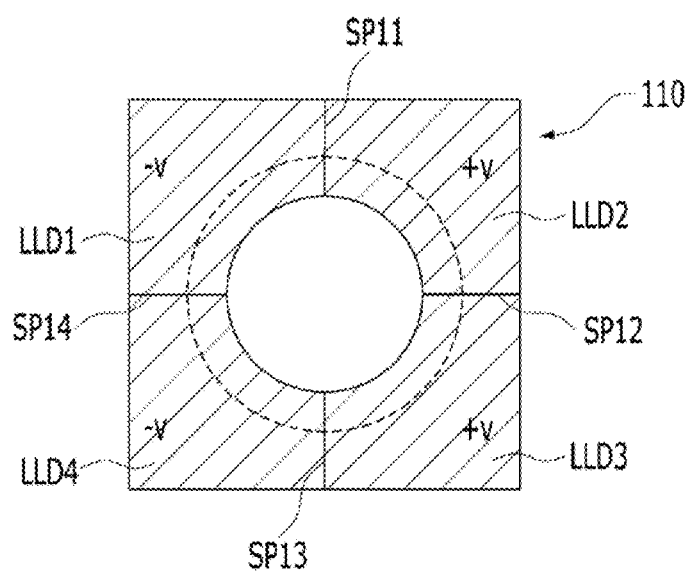
Figure 16A:
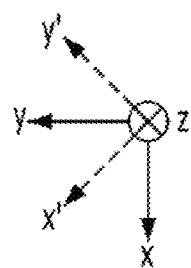
Figure 16B:
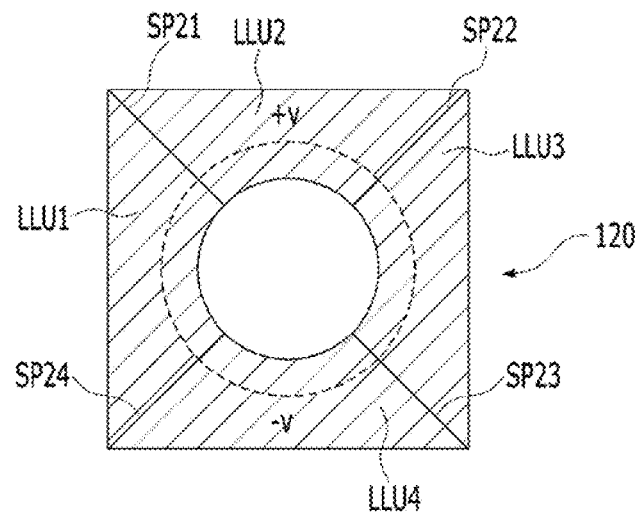
Figure 16B:
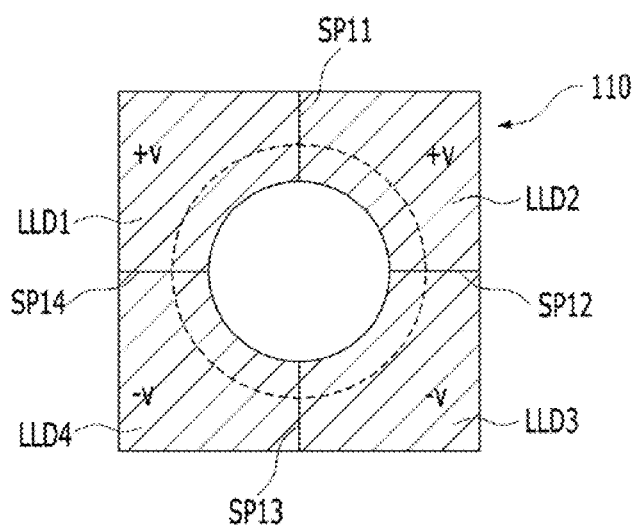
Figure 16B:
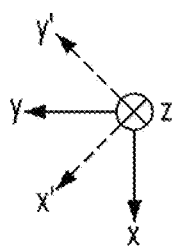
Figure 16C:
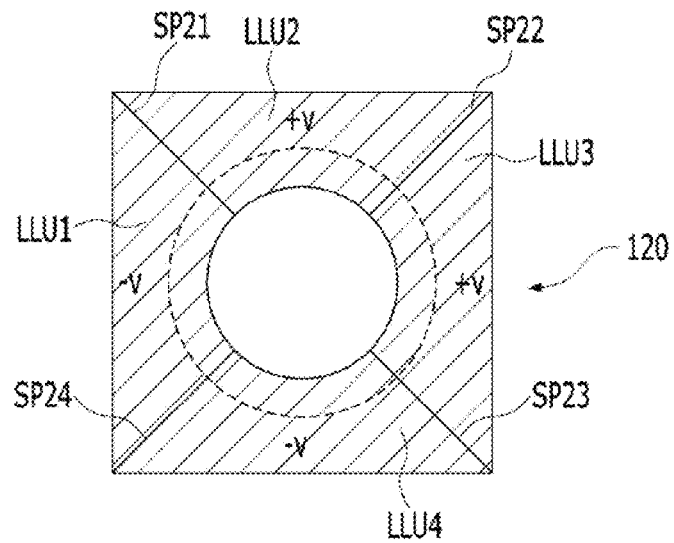
Figure 16C:
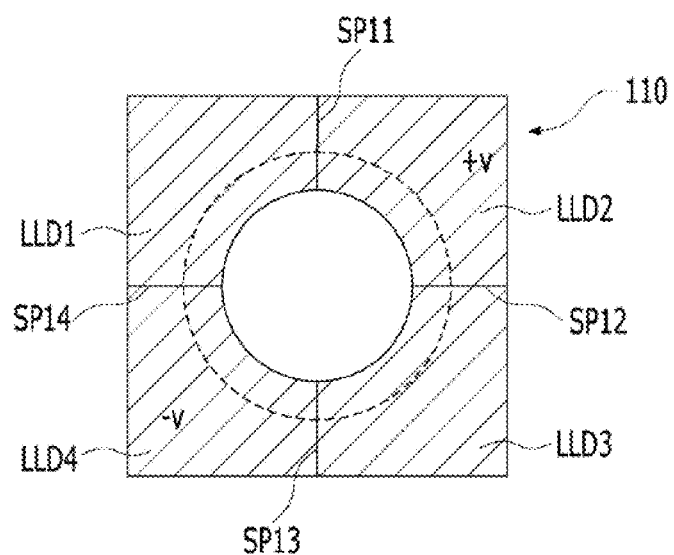
Figure 16C:
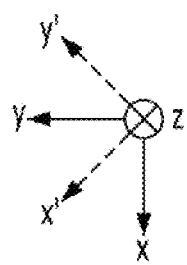

FIGS. 16A to 16C are bottom views for explaining the operation of the liquid lens module 100 according to the second embodiment. For better understanding, the first and third openings O1 and O3, which are not visible, are indicated by the dotted lines in FIGS. 16A to 16C.

When the liquid lens module 100 shakes or vibrates in the y-axis direction, in order to correct this, as shown in FIG. 16A, a negative voltage −V may be applied to each of the 1-1st and 1-4th individual electrodes LLD1 and LLD4 of the first liquid lens 110, a positive voltage +V may be applied to each of the 1-2nd and 1-3rd individual electrodes LLD2 and LLD3, a negative voltage −V may be applied to the 2-1st individual electrode LLU1 of the second liquid lens 120, and a positive voltage +V may be applied to the 2-3rd individual electrode LLU3.

Alternatively, when the liquid lens module 100 shakes or vibrates in the x-axis direction, in order to correct this, as shown in FIG. 16B, a positive voltage +V may be applied to each of the 1-1st and 1-2nd individual electrodes LLD1 and LLD2 of the first liquid lens 110, a negative voltage −V may be applied to each of the 1-3rd and 1-4th individual electrodes LLD3 and LLD4, a positive voltage +V may be applied to the 2-2nd individual electrode LLU2 of the second liquid lens 120, and a negative voltage −V may be applied to the 2-4th individual electrode LLU4.

Alternatively, when the liquid lens module 100 shakes or vibrates in a diagonal direction (e.g. in the x'-axis direction), in order to correct this, as shown in FIG. 16C, a positive voltage +V may be applied to the 1-2nd individual electrode LLD2 of the first liquid lens 110, a negative voltage −V may be applied to the 1-4th individual electrode LLD4, a positive voltage +V may be applied to each of the 2-2nd and 2-3rd individual electrodes LLU2 and LLU3 of the second liquid lens 120, and a negative voltage −V may be applied to each of the 2-1st and 2-4th individual electrodes LLU1 and LLU4.

Hereinafter, a comparison between a comparative example and the liquid lens module 100 according to the second embodiment will be made with reference to the accompanying drawings.

Figure 17A:
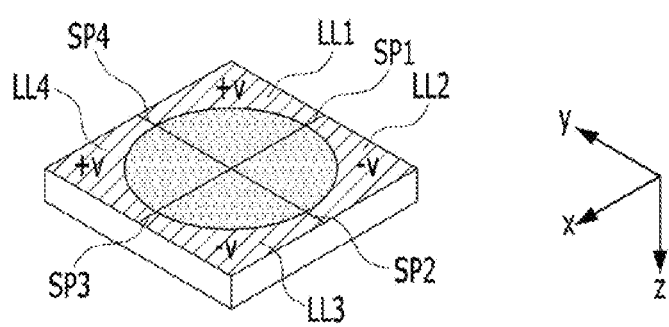
FIGS. 17A to 17C are diagrams for explaining a first operation mode of a liquid lens module according to a comparative example.
Figure 17B:
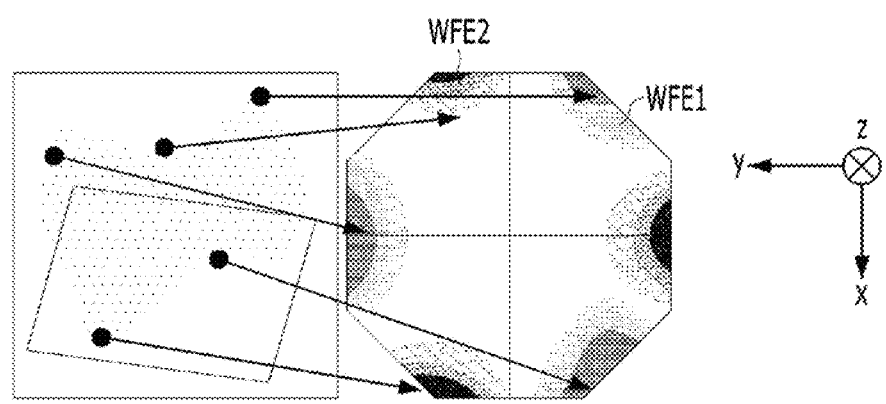
Figure 17C:
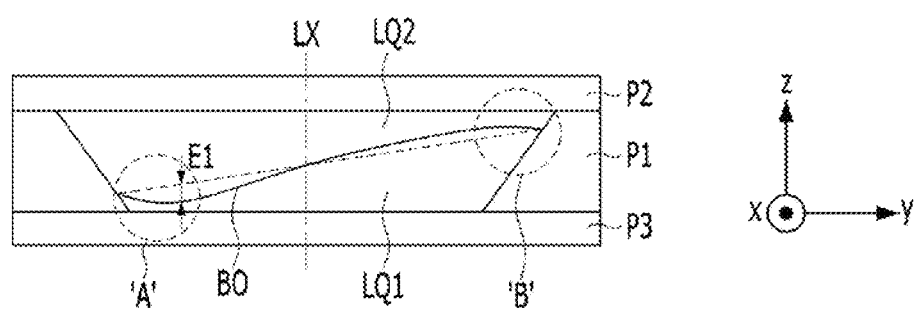
Figure 18A:
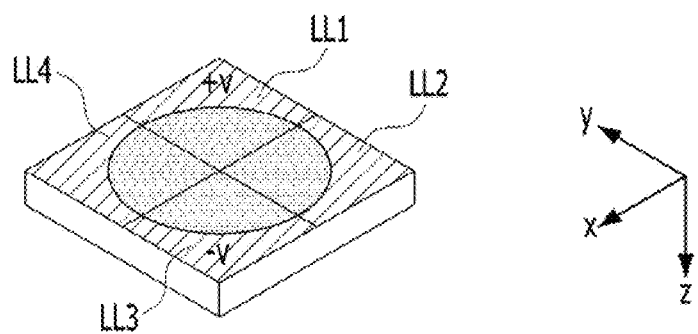
FIGS. 18A to 18C are diagrams for explaining a second operation mode of the liquid lens module according to the comparative example.
Figure 18B:
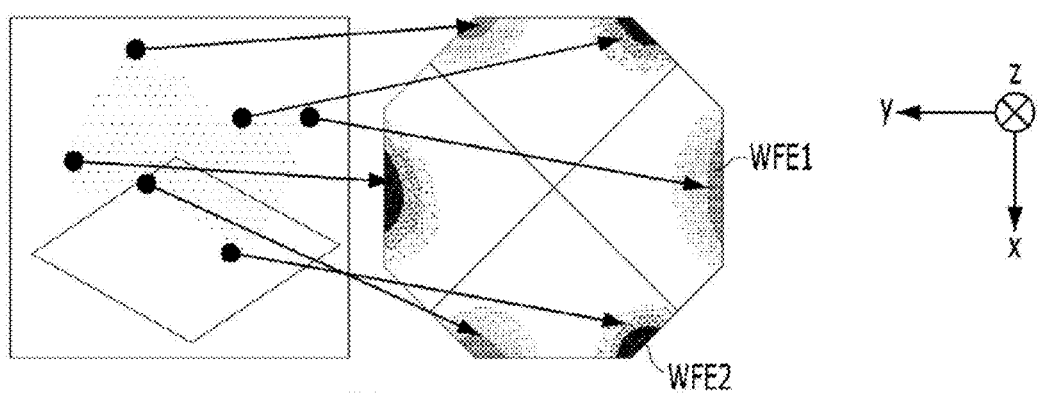
Figure 18C:
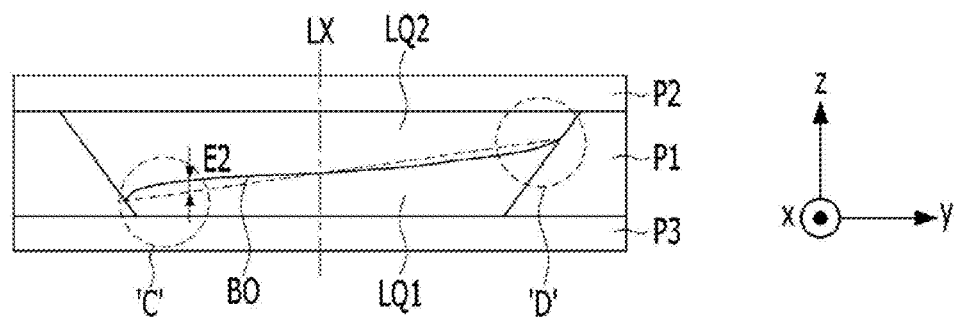

FIGS. 17A to 17C are diagrams for explaining a first operation mode of the liquid lens module according to the comparative example, and FIGS. 18A to 18C are diagrams for explaining a second operation mode of the liquid lens module according to the comparative example.

FIGS. 17A and 18A are bottom perspective views of the liquid lens module according to the comparative example. Here, the liquid lens module according to the comparative example is implemented using one liquid lens. The liquid lens may include a plurality of individual electrodes LL1 to LL4 and a plurality of boundary portions SP1 to SP4.

The plurality of individual electrodes LL1 to LL4 and the plurality of boundary portions SP1 to SP4 may respectively perform the same functions as the plurality of first individual electrodes LLU1 to LLU4 and the plurality of first boundary portions SP11 to SP14 according to the embodiment.

FIGS. 17B and 18B are diagrams for explaining a wavefront error (WFE), which occurs when the liquid lens module according to the comparative example operates in the first and second operation modes, which are different from each other.

FIGS. 17C and 18C are cross-sectional views of the liquid lens module according to the comparative example. Here, the liquid lens module according to the comparative example may include first and second liquids LQ1 and LQ2 and a plurality of plates P1 to P3.

The first and second liquids LQ1 and LQ2 and the plurality of plates P1 to P3 may respectively perform the same functions as the 1-1st and 1-2nd liquids LQ11 and LQ12 and the plurality of first to third lower plates P1L to P3L according to the second embodiment.

In the first operation mode, as shown in FIG. 17A, a positive voltage +V is applied to the first and fourth individual electrodes LL1 and LL4, and a negative voltage −V is applied to the second and third individual electrodes LL3 and LL4, whereby the interface BO between the two liquids LQ1 and LQ2 may be tilted to a predetermined angle in the y-axis direction (or in the x-axis direction), as shown in FIG. 17C. At this time, the edges A and B of the interface BO are distorted, leading to wavefront errors WFE1 and WFE2, as shown in FIG. 17B.

In the second operation mode, as shown in FIG. 18A, positive voltage +V is applied to the first individual electrode LL1, and negative voltage −V is applied to the third individual electrode LL3, whereby the interface BO between the two liquids LQ1 and LQ2 may be tilted to a predetermined angle in the diagonal direction between the x-axis direction and the +y-axis direction, as shown in FIG. 18C.

At this time, the edges C and D of the interface BO are distorted, leading to wavefront errors WFE1 and WFE2, as shown in FIG. 18B.

Although the width of each of the boundary portions SP1 to SP4 according to the comparative example is small, e.g. on the order of tens of μm, because an electrowetting phenomenon does not occur in the boundary portions SP1 to SP4, to which no voltage is applied, wavefront errors WFE1 and WFE2 may occur, as shown in FIGS. 17B and 18B.

In the case of the liquid lens module according to the comparative example, when an AF function is performed by applying the same magnitude of voltage to the four individual electrodes LL1 to LL4, no wavefront error occurs. However, as shown in FIGS. 17A to 18C, when different magnitudes of voltage are applied to the individual electrodes LL1 to LL4 in order to perform an OIS function, wavefront errors may occur, leading to degradation of the quality of an image.

FIGS. 19A to 19D are diagrams for explaining the operation characteristics of the liquid lens module 100 according to the second embodiment.

Figure 19A:
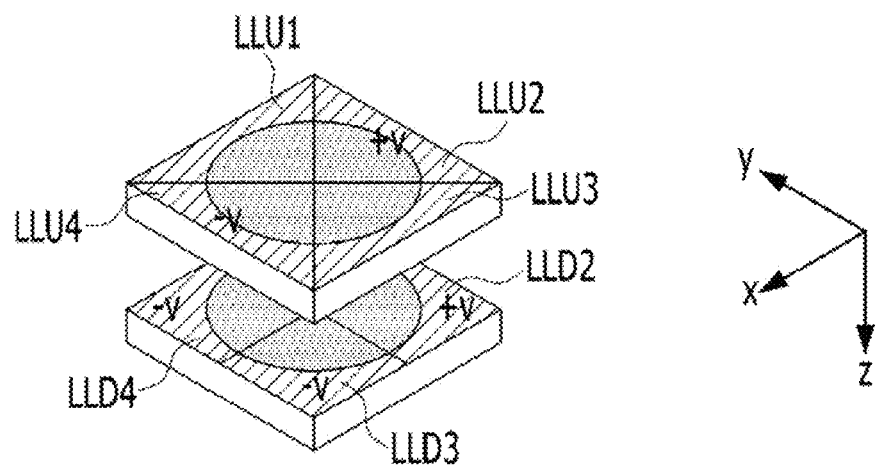
FIGS. 19A to 19D are diagrams for explaining the operation characteristics of the liquid lens module according to the second embodiment.
Figure 19B:
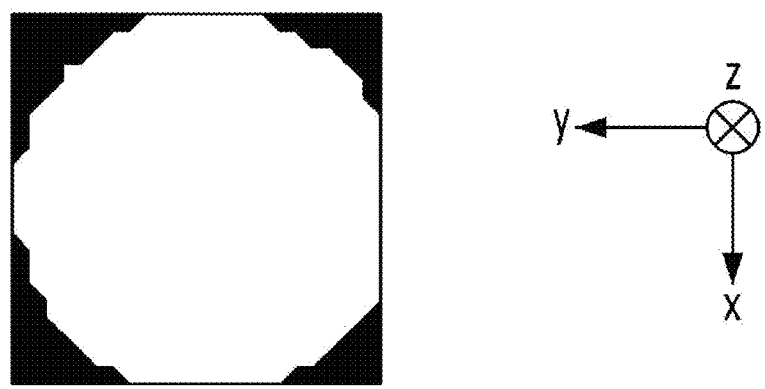
Figure 19C:
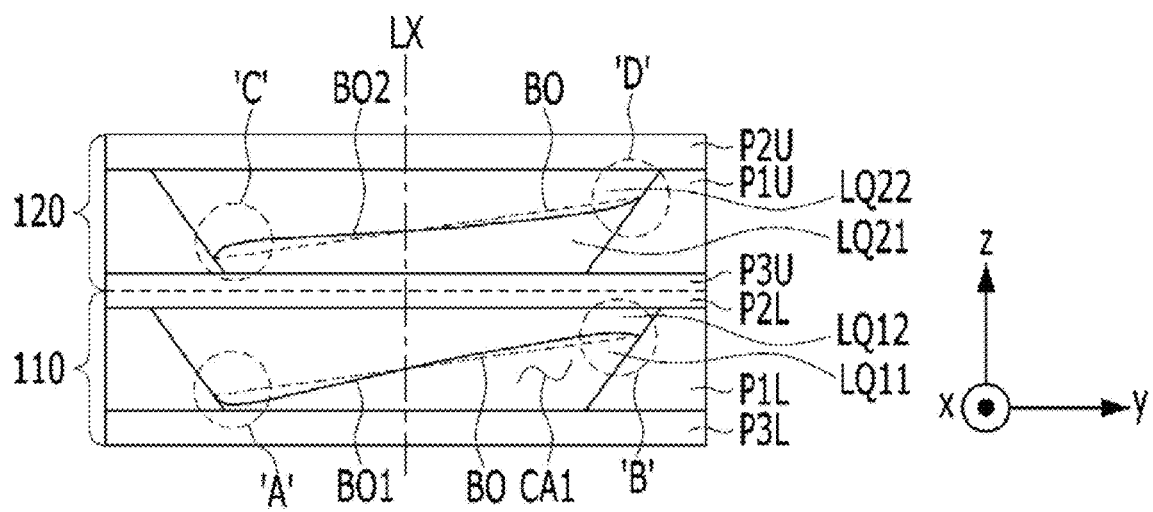
Figure 19D:
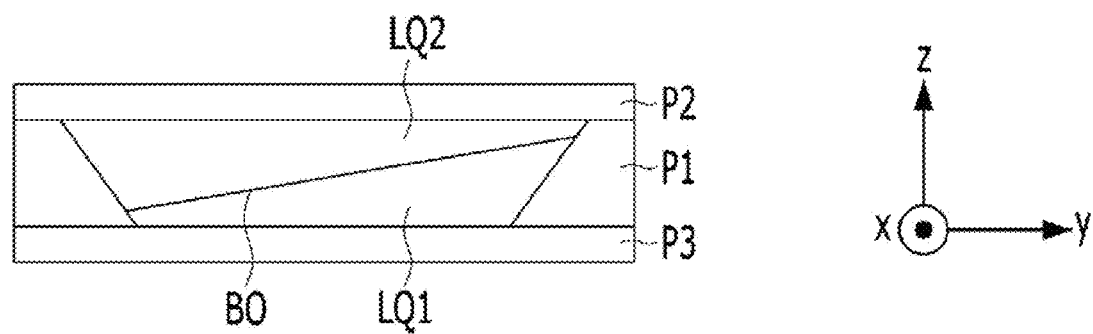

FIG. 19A is an exploded perspective view of the liquid lens module 100 shown in FIG. 12, FIG. 19B shows the WFE characteristics of the liquid lens module 100 shown in FIG. 12, FIG. 19C corresponds to the cross-sectional view shown in FIG. 15, and FIG. 19D is an equivalent cross-sectional view of the liquid lens module 100 according to the second embodiment.

In FIGS. 19A to 19C, the same parts as those shown in FIGS. 12 to 16C are denoted by the same reference numerals, and a duplicate description thereof is omitted. Also, the liquid lens module 100 shown in FIGS. 19A to 19C operates in the same manner as that shown in FIG. 16B. Accordingly, as described above with reference to FIG. 16B, corresponding voltage may be applied to the plurality of first and second individual electrodes.

Although the edges A and B of the first interface BO1 in the first liquid lens 110 are distorted and the edges C and D of the second interface BO2 in the second liquid lens 120 are distorted, the distortion at the edges A and C and the distortion at the edges C and D may cancel each other out. To this end, as described above, the minimum angle between the first direction, in which the first boundary portions, which electrically insulate the plurality of first individual electrodes, face each other with respect to the optical axis LX, and the second direction, in which the second boundary portions, which electrically insulate the plurality of second individual electrodes, face each other with respect to the optical axis LX, may be Δθ, e.g. 45°, and the first and second liquid lenses 110 and 120 may have the same configuration.

As a result, although each of the first width w1 of each of the first boundary portions SP11 to SP14 and the second width w2 of each of the second boundary portions SP21 to SP24 according to the embodiment is, for example, about several tens of μm, when the liquid lens module 100 according to the second embodiment shown in FIG. 19A is made equivalent to the liquid lens module according to the comparative example shown in FIGS. 17A to 18C, wavefront errors are reduced or do not occur in the liquid lens module 100 according to the second embodiment, as shown in FIGS. 19B and 19D, whereby the quality of an image may be improved.

FIGS. 20A to 20F are graphs for comparing the characteristics of the comparative example and the characteristics of the liquid lens module according to the second embodiment.

FIG. 21 is a table for comparing the characteristics of the comparative example and the characteristics of the liquid lens module according to the second embodiment. Here, "Static tilt" in the comparative example means the state in which the tilted shape of the interface BO between the two different liquids LQ1 and LQ2 is continuously maintained without change for a predetermined period of time or more, and "Static tilt" in the second embodiment means the state in which the tilted shapes of the interfaces BO1 and BO2 are continuously maintained without change for a predetermined period of time or more.

In each of FIGS. 20A to 20F, the horizontal axis represents time. The vertical axis in each of FIGS. 20A to 20F and "WFE" in FIG. 21 represent the size of the wavefront error 140 in the comparative example (e.g. E1 shown in FIG. 17C or E2 shown in FIG. 18C) and the size of the wavefront error 150 in the embodiment, the unit of which may be μm. Here, the wavefront error 150 in the embodiment is the sum of the wavefront error of the first interface BO1 and the wavefront error of the second interface BO2. In addition, in each of the graphs shown in FIGS. 20A to 20F, the vertical axis may correspond to the angle to which the interface is tilted in the comparative example and in the liquid lens module according to the second embodiment in order to correct shaking (or hand tremor).

Figure 20A:
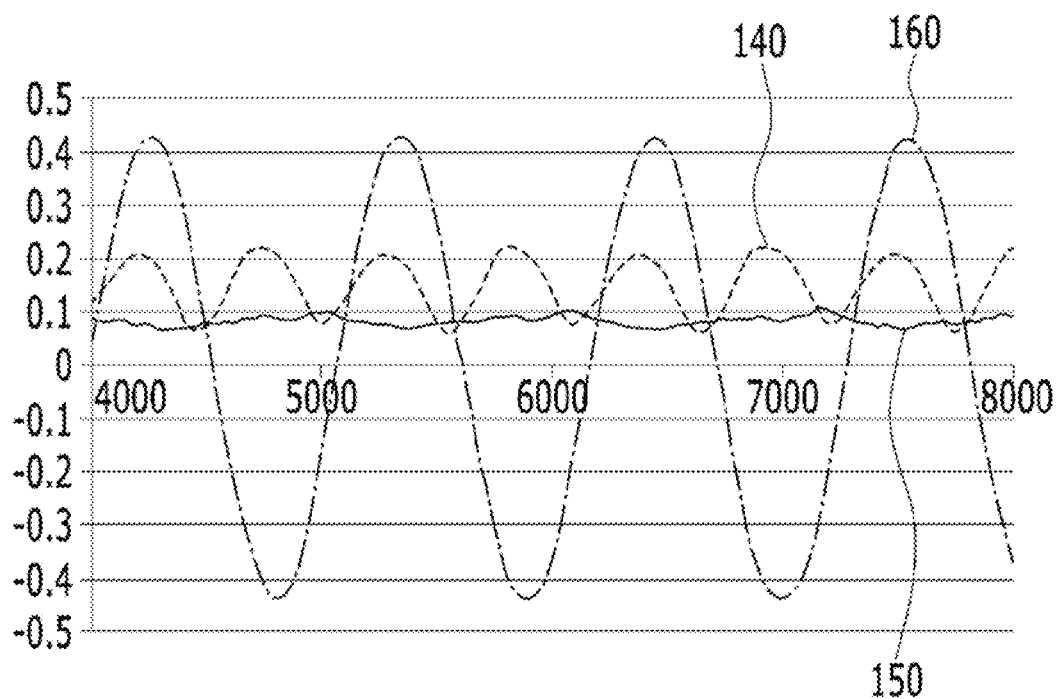
FIGS. 20A to 20F are graphs for comparing the characteristics of the comparative example and the characteristics of the liquid lens module according to the embodiment.
Figure 20B:
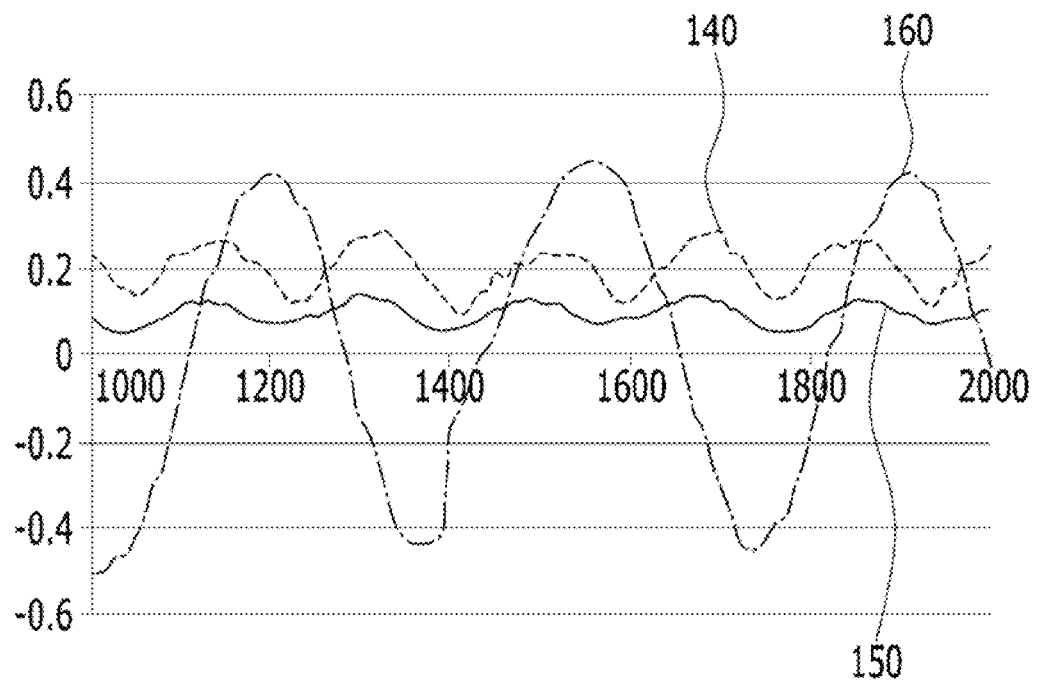
Figure 20C:
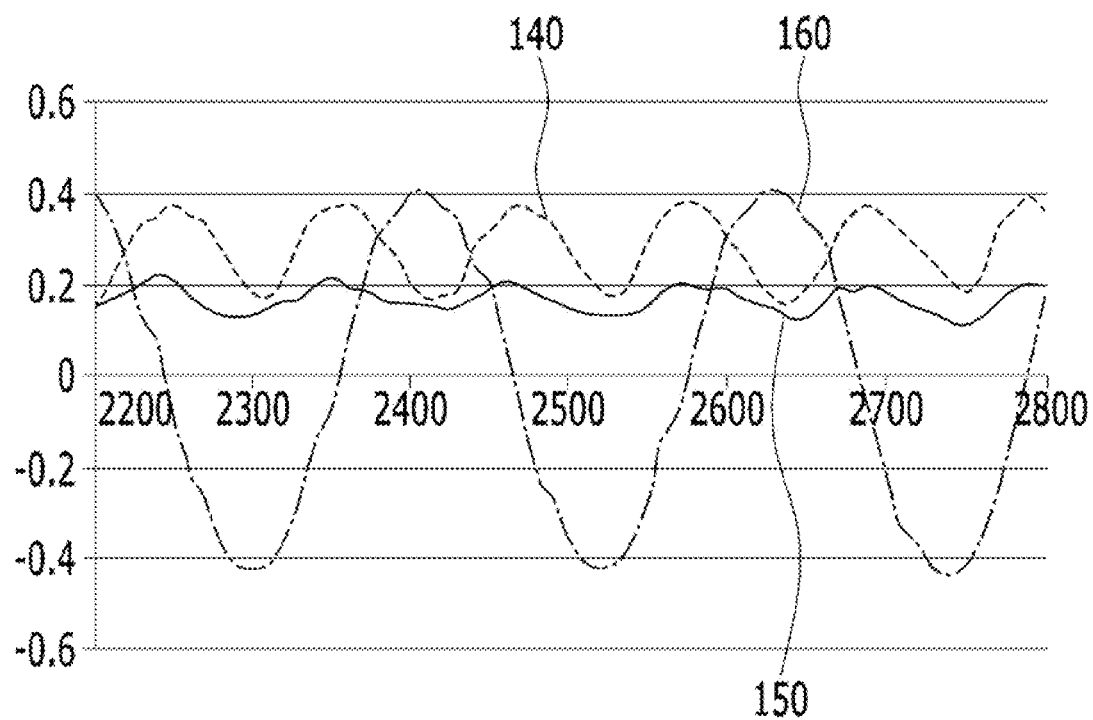
Figure 20D:
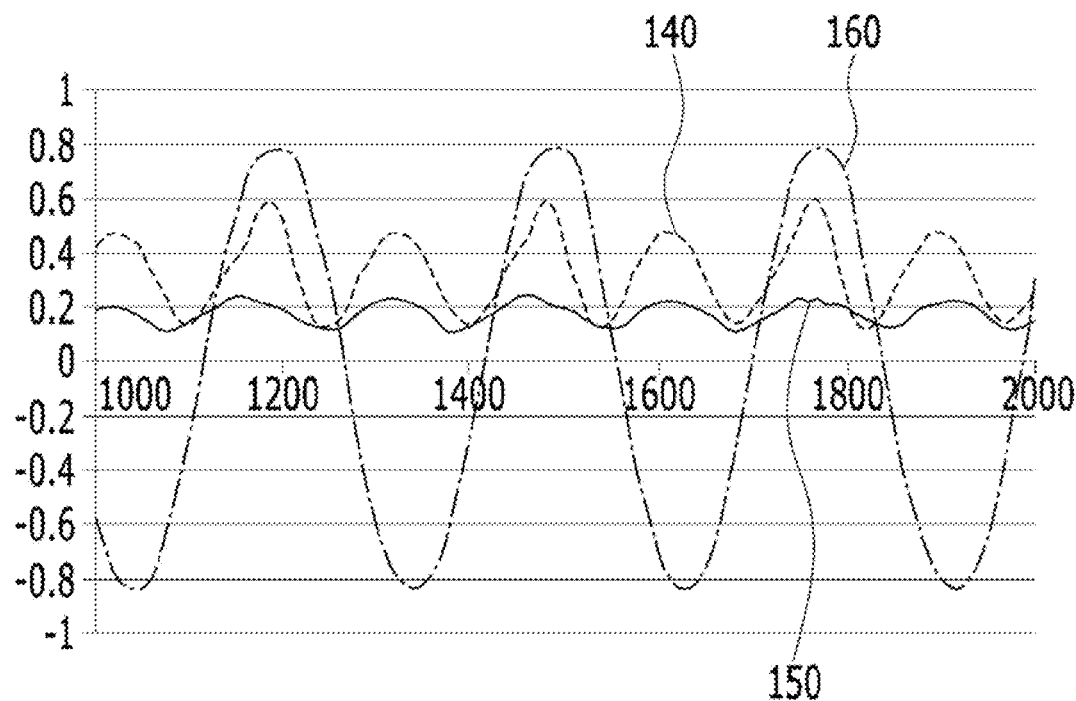
Figure 20E:
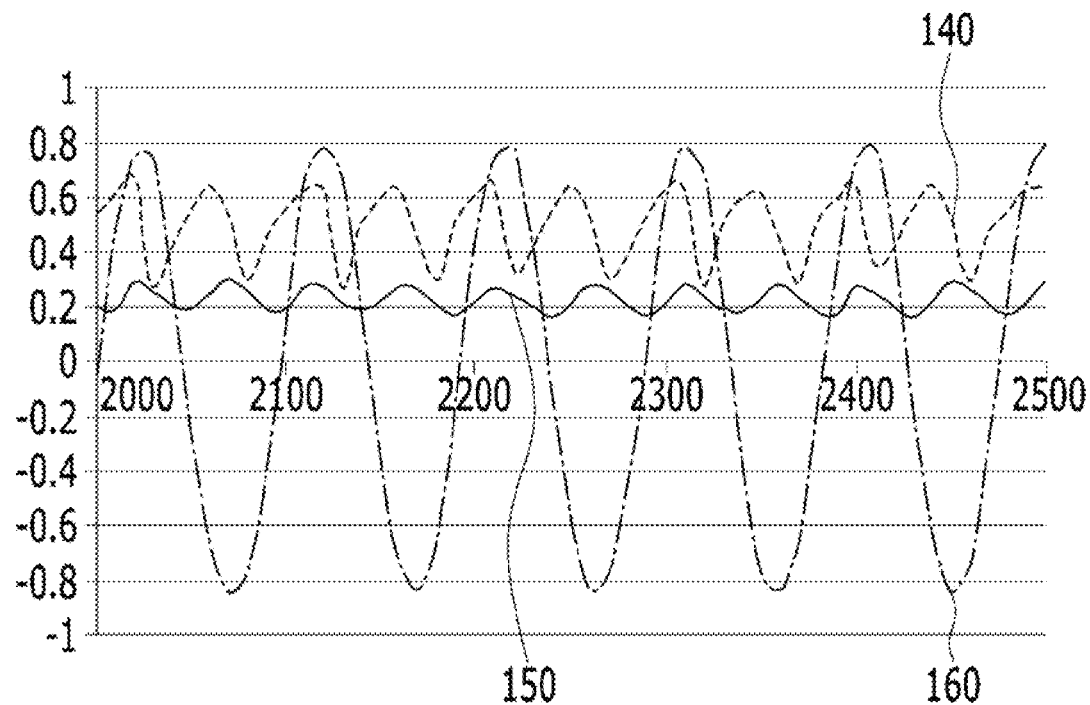
Figure 20F:
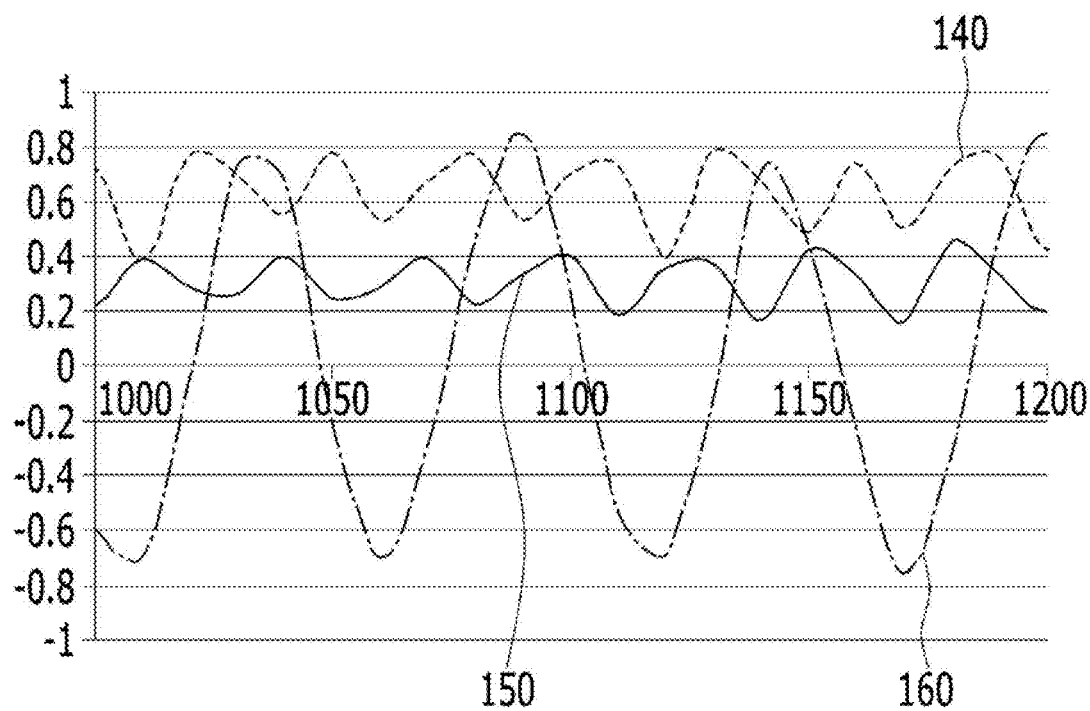

In addition, FIGS. 20A to 20C show characteristics when the liquid lens module or an instrument including the liquid lens module (e.g. a camera module or an optical instrument) is shaken at an angular amount of 0.3° and the excitation frequencies thereof are 2 Hz, 6 Hz, and 10 Hz. In addition, FIGS. 20D to 20F show characteristics when the liquid lens module or an instrument including the liquid lens module (e.g. a camera module or an optical instrument) is shaken at an angular amount of 0.6° and the excitation frequencies thereof are 2 Hz, 6 Hz, and 10 Hz. Here, the excitation frequency is the frequency at which an instrument including the liquid lens module is vibrated experimentally or arbitrarily in order to test the liquid lens module.

Referring to FIGS. 20A to 20F and 21, as a result of inspecting wavefront errors while varying a hand-tremor angle at various excitation frequencies, it can be seen that the wavefront error in the liquid lens module 100 according to the second embodiment is reduced to $\frac{1}{28}$ to $\frac{1}{2}$ of that in the comparative example.

The liquid lens module 100 according to the second embodiment described above may be applied to various fields.

Hereinafter, an optical device 200 including the liquid lens module according to the second embodiment will be described with reference to the accompanying drawings, but the optical device 200 according to the embodiment is not limited thereto.

Figure 22:
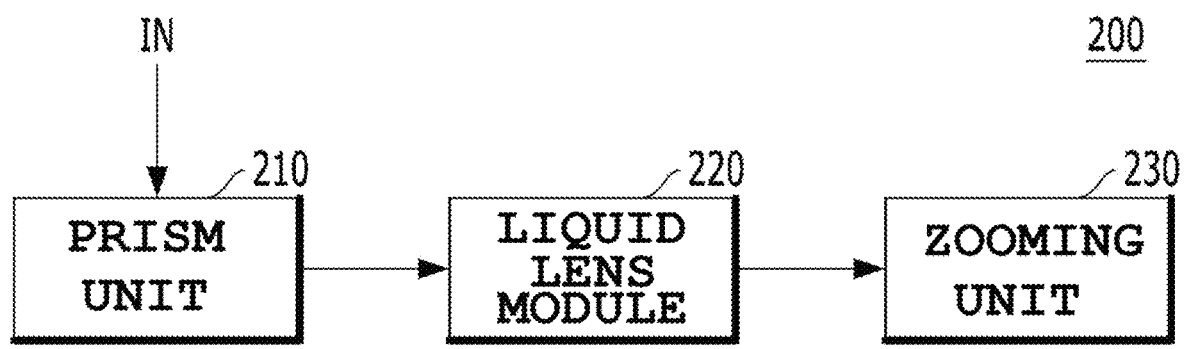
FIG. 22 is a schematic block diagram of an optical device according to an embodiment.
Figure 22:
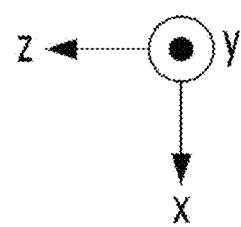

FIG. 22 is a schematic block diagram of the optical device 200 according to the embodiment.

The optical device 200 may include a prism unit 210, a liquid lens module 220, and a zooming unit 230. Here, the liquid lens module 220 may correspond to the liquid lens module 100 according to the second embodiment described above.

The prism unit 210 serves to change the path of the light that is incident in the direction indicated by IN to the optical axis LX of the liquid lens module 220.

The liquid lens module 220 performs OIS and AF functions such that the light, the path of which has been changed by the prism unit 210, is emitted to the zooming unit 230.

The zooming unit 230 zooms in/out the light that has passed through the liquid lens module 220. To this end, the zooming unit 230 may include a plurality of lenses (not shown) and an actuator (not shown) for moving the lenses in a direction parallel to the optical axis LX (e.g. in the z-axis direction).

Although only a limited number of embodiments have been described above, various other embodiments are possible. The technical contents of the above-described embodiments may be combined into various forms as long as they are not incompatible with one another, and thus may be implemented in new embodiments.

Meanwhile, an optical instrument (or an optical device) may be implemented using the camera module 30 including the liquid lens module according to the first embodiment described above or the camera module including the lens assembly having the liquid lens module 100 according to the second embodiment described above. Here, the optical instrument may include a device that may process or analyze optical signals. Examples of the optical device may include camera/video devices, telescopic devices, microscopic devices, an interferometer, a photometer, a polarimeter, a spectrometer, a reflectometer, an auto-collimator, and a lens-meter, and the embodiments may be applied to optical instruments that may include a lens assembly.

In addition, the optical instrument may be implemented in a portable device such as, for example, a smartphone, a laptop computer, and a tablet computer. Such an optical instrument may include the camera module 30 (or the camera module having the liquid lens module 100), a display unit (not shown) configured to output an image, a battery (not shown) configured to supply power to the camera module 30, and a body housing in which the camera module 30, the display unit, and the battery are mounted. The optical instrument may further include a communication module, which may communicate with other devices, and a memory, which may store data. The communication module and the memory may also be mounted in the body housing.

While the present disclosure has been described with reference to exemplary embodiments thereof, these embodiments are only proposed for illustrative purposes, and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

MODE FOR INVENTION

Various embodiments have been described in the best mode for carrying out the disclosure.

INDUSTRIAL APPLICABILITY

A lens module and a camera module including the same according to embodiments may be used in camera/video devices, telescopic devices, microscopic devices, an interferometer, a photometer, a polarimeter, a spectrometer, a reflectometer, an auto-collimator, a lens-meter, a smartphone, a laptop computer, a tablet computer, etc.

The invention claimed is:

1. A lens module, comprising:

a first plate having therein a first cavity;

a second plate overlapping the first plate in a vertical direction, the second plate having therein a second cavity;
a first liquid disposed in the first cavity; and
a second liquid disposed in the second cavity,
wherein a cross-section obtained by cutting the first cavity in a horizontal direction perpendicular to the vertical direction has a polygonal shape, and
wherein a cross-section obtained by cutting the second cavity in the horizontal direction has a circular shape.

2. The lens module according to claim 1, comprising:
a third plate disposed on the first plate;
a fourth plate disposed under the second plate; and
a third liquid disposed between the first liquid and the second liquid.

3. The lens module according to claim 1, comprising:
a third plate coupled to the first plate;
a fourth plate coupled to the second plate; and
a fifth plate disposed between the first plate and the second plate.

4. The lens module according to claim 3, comprising:
a sixth plate disposed between the first plate and the second plate,
wherein the fifth plate is coupled to the first plate, and
wherein the sixth plate is coupled to the second plate.

5. The lens module according to claim 4, comprising:
a third liquid disposed in the first cavity and a fourth liquid disposed in the second cavity.

6. The lens module according to claim 5, wherein one of the first liquid and the third liquid is a conductive liquid, and a remaining one of the first liquid and the third liquid is a non-conductive liquid.

7. A camera module, comprising:
an image sensor; and
a lens module overlapping the image sensor on an optical axis,
wherein the lens module comprises a first lens, comprising a first plate having therein a first cavity and a first liquid disposed in the first cavity, and a second lens overlapping the first lens in a direction of the optical axis, the second lens comprising a second plate having therein a second cavity and a second liquid disposed in the second cavity,
wherein the first cavity in the first lens has a cross-sectional shape in which a finite number of normal lines pass through the optical axis, and
wherein the second cavity in the second lens has a cross-sectional shape in which an infinite number of normal lines pass through the optical axis.

8. The camera module according to claim 7, wherein the first lens is controlled to correct shaking, and the second lens is controlled to adjust a focus.

9. A liquid lens module, comprising:
a first liquid lens comprising a first cavity and a plurality of first individual electrodes disposed so as to be spaced apart from each other, with a first boundary portion interposed therebetween, the first boundary portion comprising a plurality of boundary portions; and
a second liquid lens comprising a second cavity overlapping the first cavity in a direction of an optical axis and a plurality of second individual electrodes disposed so as to be spaced apart from each other, with a second boundary portion interposed therebetween, the second boundary portion comprising a plurality of boundary portions,
wherein the first boundary portion and the second boundary portion are disposed so as not to overlap each other in a direction parallel to the optical axis.

10. The liquid lens module according to claim 9, wherein, when viewed in plan, a minimum angle between a first imaginary line extending from the optical axis, passing through a center of the first cavity and a center of the second cavity, to the first boundary portion and a second imaginary line extending from the optical axis to the second boundary portion is equal to or less than Δθ expressed below:

$$\Delta\theta = \frac{360°}{(M+N)}$$

where M represents a number of the first individual electrodes, and N represents a number of the second individual electrodes.

11. The camera module according to claim 9, wherein each of the plurality of first individual electrodes and the second boundary portion overlap each other in the direction parallel to the optical axis, and
wherein each of the plurality of second individual electrodes and the first boundary portion overlap each other in the direction parallel to the optical axis.

12. The camera module according to claim 9, wherein the first liquid lens comprises:
a first lower plate including therein the first cavity in which a conductive liquid and a non-conductive liquid are disposed;
a second lower plate disposed on one of an upper side and a lower side of the first lower plate; and
a third lower plate disposed on the other one of the upper side and the lower side of the first lower plate, and
wherein the second liquid lens comprises:
a first upper plate including therein the second cavity in which a conductive liquid and a non-conductive liquid are disposed;
a second upper plate disposed on one of an upper side and a lower side of the first upper plate; and
a third upper plate disposed on the other one of the upper side and the lower side of the first upper plate.

13. The camera module according to claim 12, wherein one of the second and third lower plates and one of the second and third upper plates face each other, and are integrated with each other.

14. The camera module according to claim 12, wherein the first cavity includes first and second openings, respectively formed in an upper portion and a lower portion of the first lower plate;
wherein the second cavity includes third and fourth openings, respectively formed in an upper portion and a lower portion of the first upper plate,
wherein a larger opening among the first and second openings and a larger opening among the third and fourth openings have the same size, and
wherein a smaller opening among the first and second openings and a smaller opening among the third and fourth openings have the same size.

15. The camera module according to claim 9, wherein the first boundary portion is disposed in a direction corresponding to an edge of the first liquid lens, and
wherein the second boundary portion is disposed in a direction corresponding to a corner of the second liquid lens.

16. The camera module according to claim 1, wherein the first plate is disposed on the second plate.

17. The camera module according to claim 1, wherein the first plate is disposed under the second plate.

18. The camera module according to claim 4, wherein the fifth plate and the sixth plate are integrated with each other.

19. The camera module according to claim 4, wherein the fifth plate and the sixth plate are disposed so as to be spaced apart from each other by a predetermined distance in an optical-axis direction.

20. The camera module according to claim 5, wherein one of the second liquid and the fourth liquid is a conductive liquid, and a remaining one of the second liquid and the fourth liquid is a non-conductive liquid.

* * * * *